US009529588B2

(12) United States Patent
Maeda et al.

(10) Patent No.: US 9,529,588 B2
(45) Date of Patent: Dec. 27, 2016

(54) INFORMATION PROCESSING APPARATUS AND NETWORK SYSTEM FOR UPDATING FIRMWARE MODULES

(71) Applicants: Hiroshi Maeda, Kanagawa (JP); Miki Oouchi, Kanagawa (JP); Rie Nakamura, Kanagawa (JP); Shigeyuki Ishii, Kanagawa (JP); Ryo Iwasaki, Kanagawa (JP); Hiroki Ozaki, Tokyo (JP); Hiroki Mori, Kanagawa (JP)

(72) Inventors: Hiroshi Maeda, Kanagawa (JP); Miki Oouchi, Kanagawa (JP); Rie Nakamura, Kanagawa (JP); Shigeyuki Ishii, Kanagawa (JP); Ryo Iwasaki, Kanagawa (JP); Hiroki Ozaki, Tokyo (JP); Hiroki Mori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/070,762

(22) Filed: Nov. 4, 2013

(65) Prior Publication Data
US 2014/0130028 A1    May 8, 2014

(30) Foreign Application Priority Data

Nov. 7, 2012 (JP) ................................ 2012-245044

(51) Int. Cl.
*G06F 9/44* (2006.01)
*G06F 9/445* (2006.01)

(52) U.S. Cl.
CPC ................. *G06F 8/71* (2013.01); *G06F 8/665* (2013.01)

(58) Field of Classification Search
CPC ................... G06F 8/60–8/68; G06F 8/70–8/71

USPC .................................................. 717/168–178
See application file for complete search history.

(56) References Cited

U.S. PATENT DOCUMENTS

| 6,373,932 B2 * | 4/2002 | Bakshi ...................... G06F 8/65 379/112.01 |
| 6,405,219 B2 * | 6/2002 | Saether ............. G06F 17/30194 |
| 7,182,462 B2 * | 2/2007 | Castaldi ................. G03B 21/26 348/744 |

(Continued)

FOREIGN PATENT DOCUMENTS

| JP | 2004-234056 | 8/2004 |
| JP | 2011-034569 | 2/2011 |

*Primary Examiner* — Francisco Aponte
(74) *Attorney, Agent, or Firm* — Oblon, McClelland, Maier & Neustadt, L.L.P.

(57) ABSTRACT

An information processing apparatus stores configuration information including sets of version information of modules of firmware in the apparatus; obtains, based on the configuration information, firmware information including sets of version information of modules of firmware in a latest version; compares the sets of version information in the configuration information with those in the firmware information, and, when the sets of version information in the configuration information are not coincident with those in the firmware information, determines that it is possible to update the firmware in the apparatus; downloads the firmware in the latest version; and compares the sets of version information in the downloaded firmware with those in the configuration information, and updates only the module of the firmware in the apparatus for which the version information in the downloaded firmware is different from that in the configuration information.

19 Claims, 21 Drawing Sheets

(56) References Cited

U.S. PATENT DOCUMENTS

| | | | | |
|---|---|---|---|---|
| 7,197,562 B2* | 3/2007 | Murtha | ............... | H04L 67/02 709/217 |
| 8,180,867 B2* | 5/2012 | Wan | ............... | G06F 11/3006 709/217 |
| 8,395,652 B1* | 3/2013 | Chapweske | ......... | H04L 12/1881 348/14.05 |
| 8,423,993 B2* | 4/2013 | Faus | ................. | G06F 8/65 717/169 |
| 8,438,558 B1* | 5/2013 | Adams | ................. | 717/170 |
| 8,539,102 B2* | 9/2013 | Garcia | ............... | H04L 67/02 709/239 |
| 8,606,765 B2* | 12/2013 | Boggs | ............... | G06F 8/65 707/695 |
| 9,146,822 B2* | 9/2015 | Patankar | ............ | G06F 11/2097 |
| 2005/0024219 A1* | 2/2005 | Childers | ............ | 340/641 |
| 2006/0007400 A1* | 1/2006 | Castaldi et al. | ............ | 353/30 |
| 2007/0299958 A1* | 12/2007 | Hu | ................. | H04L 41/06 709/223 |
| 2011/0141232 A1* | 6/2011 | Tsukagoshi | ............ | 348/43 |
| 2011/0252071 A1* | 10/2011 | Cidon | ............... | 707/802 |
| 2012/0177292 A1* | 7/2012 | Cheon | ............ | G06F 17/30026 382/190 |
| 2012/0204167 A1* | 8/2012 | Yoshida | ............... | 717/170 |
| 2013/0019236 A1* | 1/2013 | Nakagawa et al. | ............ | 717/170 |
| 2013/0238552 A1* | 9/2013 | Saib | ................. | 707/609 |

\* cited by examiner

FIG.8

| FIRMWARE ID | VERSION INFORMATION | | | LOCATION INFORMATION |
|---|---|---|---|---|
| | MODULE A | MODULE B | MODULE C | |
| ALT1_X_000000 | 04 | 10 | 22 | http://aaa.co.jp/baa |
| ALT1_X_000010 | 03 | 10 | 21 | http://aaa.co.jp/bcc |
| ALT1_X_001000 | 03 | 10 | 20 | http://aaa.co.jp/bbb |
| ... | ... | ... | ... | ... |

| VERSION INFORMATION PART | 031020 |
|---|---|
| LOCATION INFORMATION PART | http://aaa.co.jp/bbb |

140

142
144

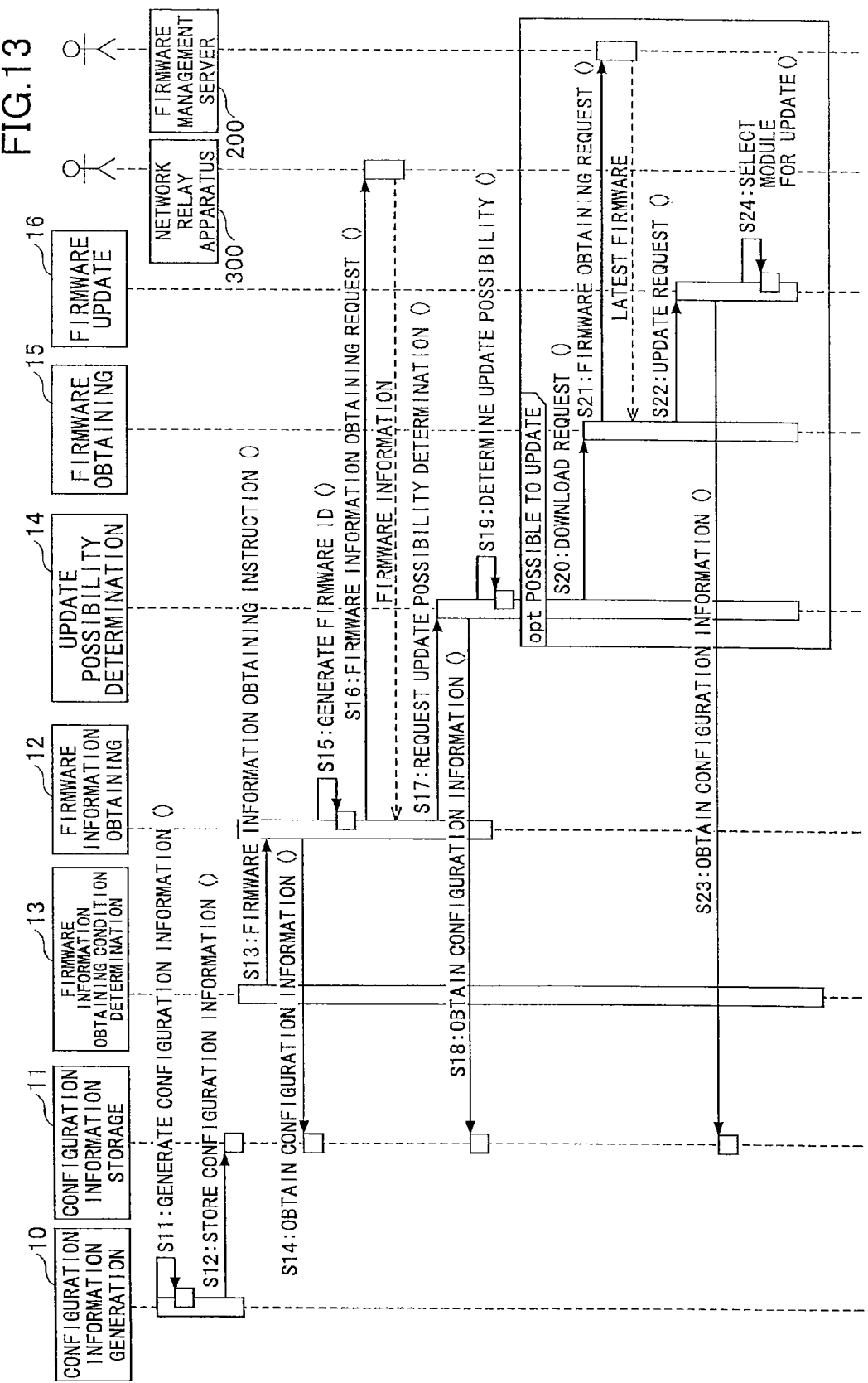

FIG.22

| | 031020 |
|---|---|
| VERSION INFORMATION PART 172 | |
| LOCATION INFORMATION PART 174 | MODULE A | http://aaa.co.jp/bbb/soft_a |
| | MODULE B | http://aaa.co.jp/bbb/soft_b |
| | MODULE C | http://aaa.co.jp/bbb/soft_c |

170

INFORMATION PROCESSING APPARATUS AND NETWORK SYSTEM FOR UPDATING FIRMWARE MODULES

BACKGROUND OF THE INVENTION

1. Field of the Invention

The present invention relates to an image processing apparatus and a network system, and, in more detail, to remote update of firmware that is mounted in the information processing apparatus.

2. Description of the Related Art

A firmware mounted in a projector may be updated as needed for the purpose of improving a function(s) and/or solving a problem(s), if any. In this regard, a technology is known in which a recording medium such as a USB memory that stores update data is connected with a projector, and a firmware mounted in the projector is updated using the update data.

However, in this method, a user needs to manually carry out the update work that may be troublesome for the user.

In this regard, Japanese Laid-Open Patent Application No. 2004-234056 discloses a method in which a firmware in a peripheral apparatus is updated using a network. However, this method assumes an apparatus that is used in such a manner that the power is continuously supplied. Therefore, this method cannot be applied to an apparatus such as a projector that is not assumed to be used in such a manner that the power is supplied continuously.

SUMMARY OF THE INVENTION

According to one embodiment of the present invention, an information processing apparatus includes firmware that includes a plurality of modules and is mounted in the information processing apparatus; a configuration information storage part that stores configuration information that includes sets of version information of the respective modules included in the firmware; a firmware information obtaining part that obtains, based on the configuration information, from the outside, firmware information that includes sets of version information of respective modules of firmware in a latest version; an update possibility determination part that compares the sets of version information included in the configuration information with the sets of version information included in the firmware information, and, in a case where the sets of version information in the configuration information are not coincident with the sets of version information in the firmware information, determines that it is possible to update the firmware in the information processing apparatus; a firmware obtaining part that downloads, from the outside, the firmware in the latest version corresponding to the firmware in the information processing apparatus for which the update possibility determination part has determined that it is possible to update; and a firmware update part that compares the sets of version information of respective modules included in the downloaded firmware in the latest version with the sets of version information of the corresponding respective modules included in the configuration information, and updates only the module of the firmware in the information processing apparatus for which the version information in the downloaded firmware is different from the version information in the configuration information.

Other objects, features and advantages of the present invention will become more apparent from the following detailed description when read in conjunction with the accompanying drawings.

BRIEF DESCRIPTION OF THE DRAWINGS

FIG. 8 shows a firmware information management table according to the first embodiment;

FIG. 9 shows a data structure of firmware information according to the first embodiment;

FIG. 13 shows a sequence diagram of processes carried out by the video output apparatus according to the first embodiment;

FIG. 22 shows a data structure of firmware information in a design variation in the first embodiment;

DETAILED DESCRIPTION OF THE EMBODIMENTS

Figure 1:
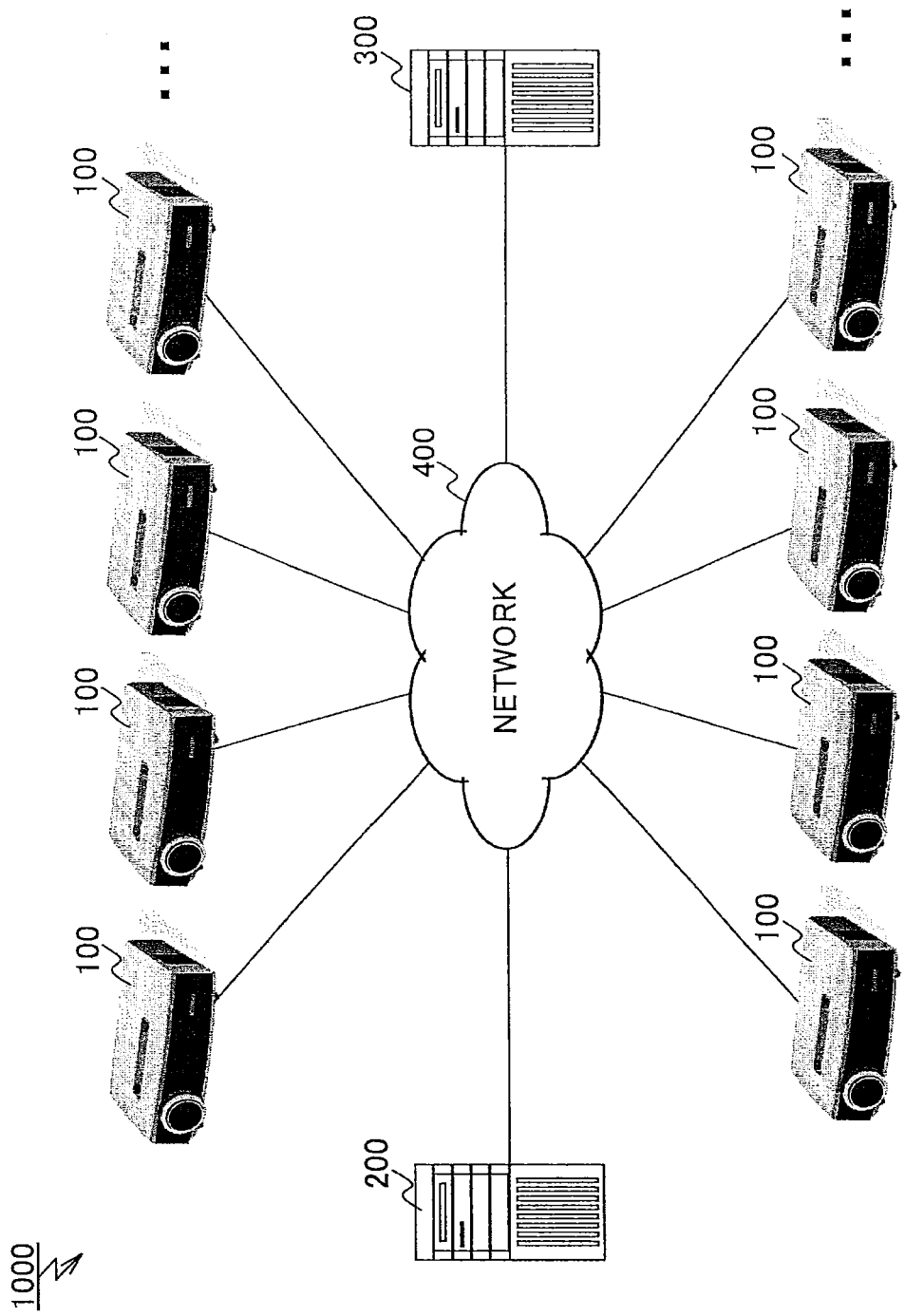
FIG. 1 shows a network system including video output apparatuses according to a first embodiment.

Below, the first embodiment and design variation therein will be described. However, the present invention is not limited to the first embodiment and design variation therein.

Note that, in the respective drawings to be used for describing the first embodiment, the same reference numerals are given to common elements, and duplicate description may be omitted.

FIG. 1 shows a configuration of a network system 1000 including video output apparatuses 100 according to the first embodiment.

The network system 1000 includes a plurality of the video output apparatuses 100, a firmware management server 200 and a network relay apparatus 300. These apparatuses are mutually connected by a network 400 such as a LAN, a VPN, the Internet, or the like.

The video output apparatuses 100 are apparatuses that project images on screens, and may be called "projectors".

In the respective video output apparatuses 100, predetermined sets of firmware are mounted. The sets of firmware are executed by processors in the video output apparatuses 100, and thus, the sets of firmware cause the processors to carry out information processing for implementing various functions such as those projecting images on the screens.

According to the first embodiment, in the respective video output apparatuses 100, different sets of firmware are mounted for respective apparatus types thereof. Further, in some of the video output apparatuses 100 in the same apparatus type, different sets of firmware may be mounted, respectively.

The firmware management server 200 is an apparatus that manages the sets of firmware mounted in the video output apparatuses 100 connected to the network 400, and may be called a "file server".

A developer who develops the firmware uploads it to the firmware management server 200 each time when the developer newly releases the firmware. The firmware management server 200 always stores the latest versions of firmware, and unifies management thereof.

According to the first embodiment, when updating the firmware, each of the video output apparatuses 100 downloads the latest version of firmware from the firmware management server 200, and installs it therein.

With regard to the firmware update, the network relay apparatus 300 relays, between the video output apparatuses 100 and the firmware management server 200, predetermined information (referred to as firmware information, hereinafter) concerning the latest sets of firmware that have been uploaded to the firmware management server 200. In this retard, description will now be made in detail using FIG. 2.

Figure 2:
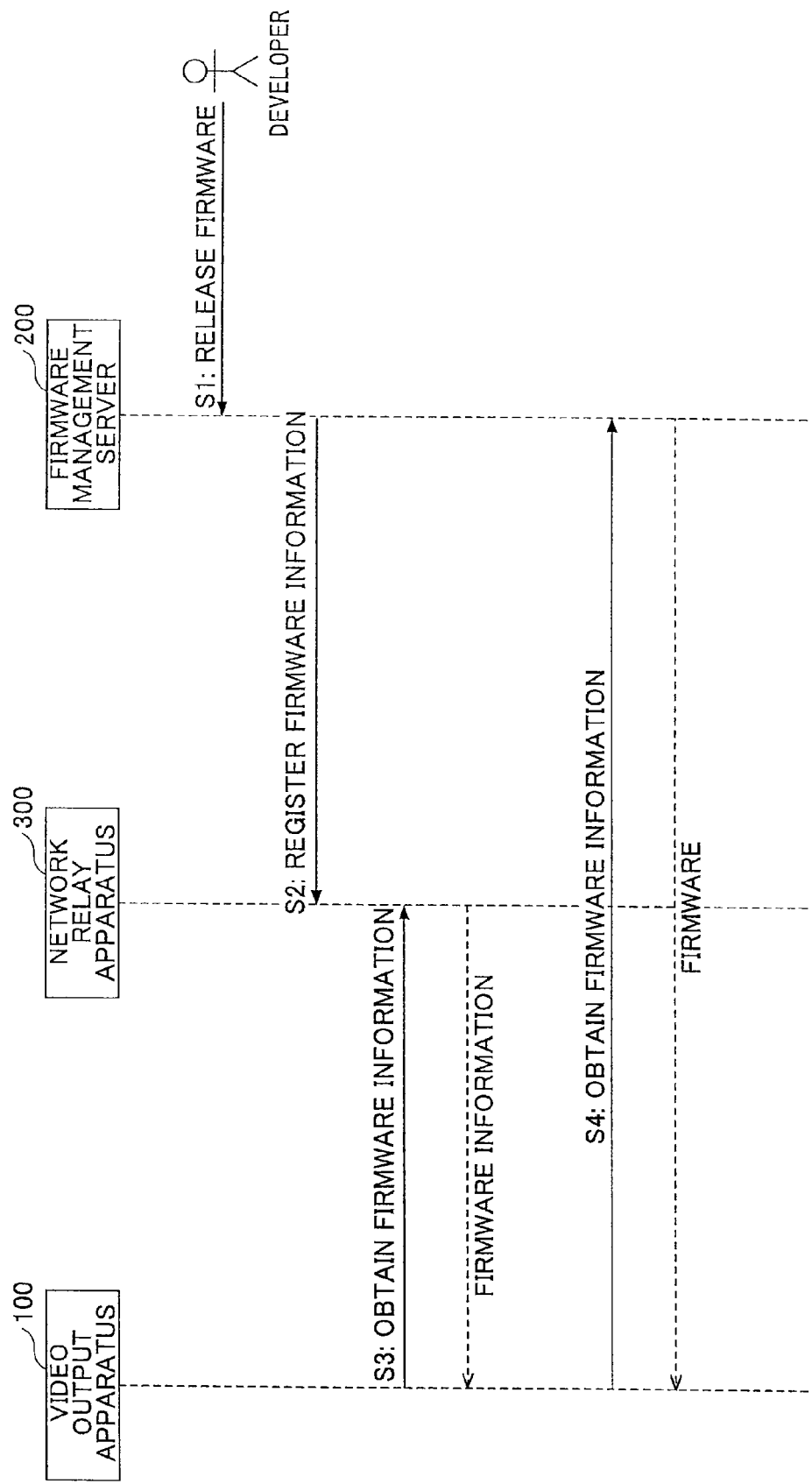
FIG. 2 shows a sequence diagram concerning remote update of firmware.

FIG. 2 shows a sequence diagram concerning remote update of the firmware.

A firmware developer who has released new firmware uploads the firmware to the firmware management server 200 (step S1).

In response thereto, the firmware management server 200 registers firmware information concerning the latest firmware with the network relay apparatus 300 (step S2).

In the network relay apparatus 300, the firmware information is registered in a manner of being associated with identification information (referred to as a firmware ID, hereinafter) of the corresponding firmware.

Details of firmware information will be described later.

On the other hand, each of the video output apparatuses 100 obtains firmware information from the network relay apparatus 300 in predetermined timing (step S3).

Each of the video output apparatuses 100 determines, based on the obtained firmware information, firmware to be used for update, and obtains (downloads) the firmware from the firmware management server 200 (step S4).

Thus, firmware remote update according to the first embodiment has been generally described.

Next, functions of each of the video output apparatuses 100 will now be described.

Figure 3:
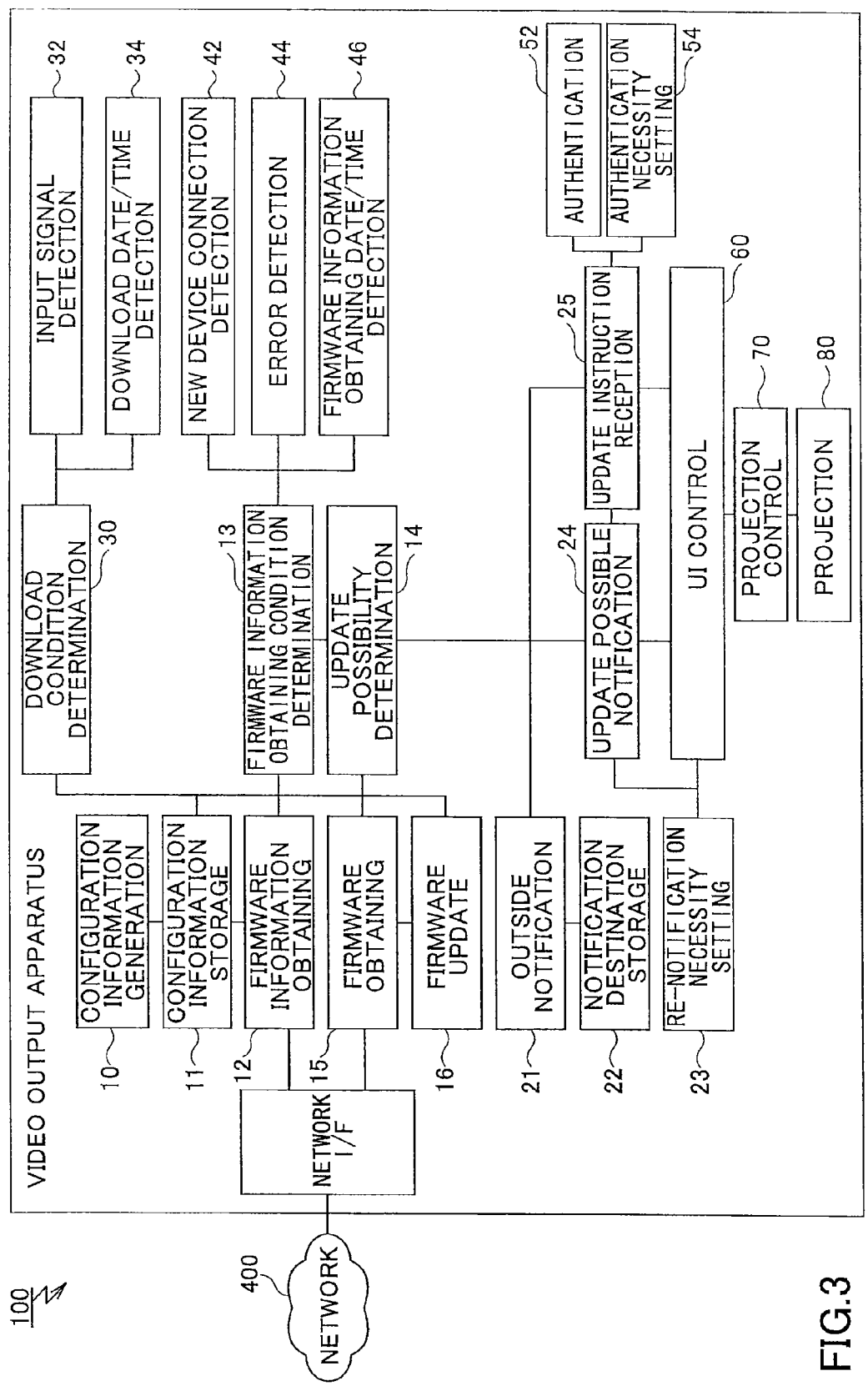
FIG. 3 shows a functional block diagram of a video output apparatus according to the first embodiment.

FIG. 3 shows a functional block diagram of each of the video output apparatuses 100.

As shown in FIG. 3, each of the video output apparatuses 100 includes a configuration information generation part 10, a configuration information storage part 11, a firmware information obtaining part 12, a firmware information obtaining condition determination part 13, an update possibility determination part 14, a firmware obtaining part 15 and a firmware update part 16.

Each of the video output apparatuses 100 further includes an outside notification part 21, a notification destination storage part 22, a re-notification necessity setting part 23, an update possible notification part 24 and an update instruction reception part 25.

Each of the video output apparatuses 100 further includes a download condition determination part 30, an input signal detection part 32, a download date/time detection part 34, a new device connection detection part 42, an error detection part 44, a firmware information obtaining date/time detection part 46, an authentication part 52, an authentication necessity setting part 54, a UI control part 60, a projection control part 70 and a projection part 80.

Below, each of these functional parts shown in FIG. 3 will be generally described in a manner of focusing on one of the video output apparatuses 100 for the sake of convenience.

The configuration information generation part 10 dynamically generates configuration information of firmware mounted in the video output apparatus 100, and stores the generated configuration information in the configuration information storage part 11. Configuration information will be described in detail.

The firmware information obtaining part 12 obtains firmware information from the network relay apparatus 300. The firmware information obtaining condition determination part 13 determines whether a condition for obtaining the firmware information has been satisfied, and notifies the firmware information obtaining part 12 that the condition has been satisfied. The firmware information obtaining part 12 obtains the firmware information in response to the notification indicating that the condition has been satisfied.

The firmware obtaining part 15 downloads firmware from the firmware management apparatus 200 and stores it. The download condition determination part 30 determines whether a condition for downloading the firmware from the firmware management part 200 has been satisfied, and notifies the firmware obtaining part 15 that the condition has been satisfied. The firmware obtaining part 15 downloads the firmware in response to the notification indicating that the condition has been satisfied.

The update possibility determination part 14 determines whether it is possible to update firmware, based on firmware information obtained from the network relay apparatus 300 and configuration information stored by the configuration information storage part 11. The firmware update part 16 updates the firmware which the update possibility determination part 14 has determined that it is possible to update.

The update possible notification part 24 notifies the user of the video output apparatus 100 that it is possible to update firmware. The outside notification part 21 notifies that it is possible to update firmware to the outside (for example, an administrator). The notification destination storage part 22 stores information of notification destination in the outside (for example, a mail address).

The update instruction reception part 25 receives an update instruction from the user of the video output apparatus 100. The re-notification necessity setting part 23 stores a setting as to whether to again notify the user that it is possible to update firmware.

The new device connection detection part 42 detects that a device with which the current firmware is not compatible has been connected.

The error detection part 44 detects that an error has occurred in the video output apparatus 100.

The firmware information obtaining date/time detection part 46 detects the coming of a predetermined set date and time for obtaining firmware information.

The authentication part 52 carries out user authentication. The authentication necessity setting part 45 stores a setting as to whether to carry out user authentication.

The input signal detection part 32 detects that an input signal has not been received for a predetermined period of time.

The download date/time detection part 34 detects the coming of a set date and time for downloading predetermined firmware.

The UI control part 60 notifies the user using a UI screen page, receives the user's operation, and so forth. The projection control part 70 controls the projection part 80 and projects the UI screen page generated by the UI control part 60 on a screen.

Thus, the functions of the video output device 100 have been described.

Next, the specific process contents carried out by the respective functional parts described above will be described in sequence.

Note that FIG. 3 will be referred to as needed in the description below.

Figure 4:
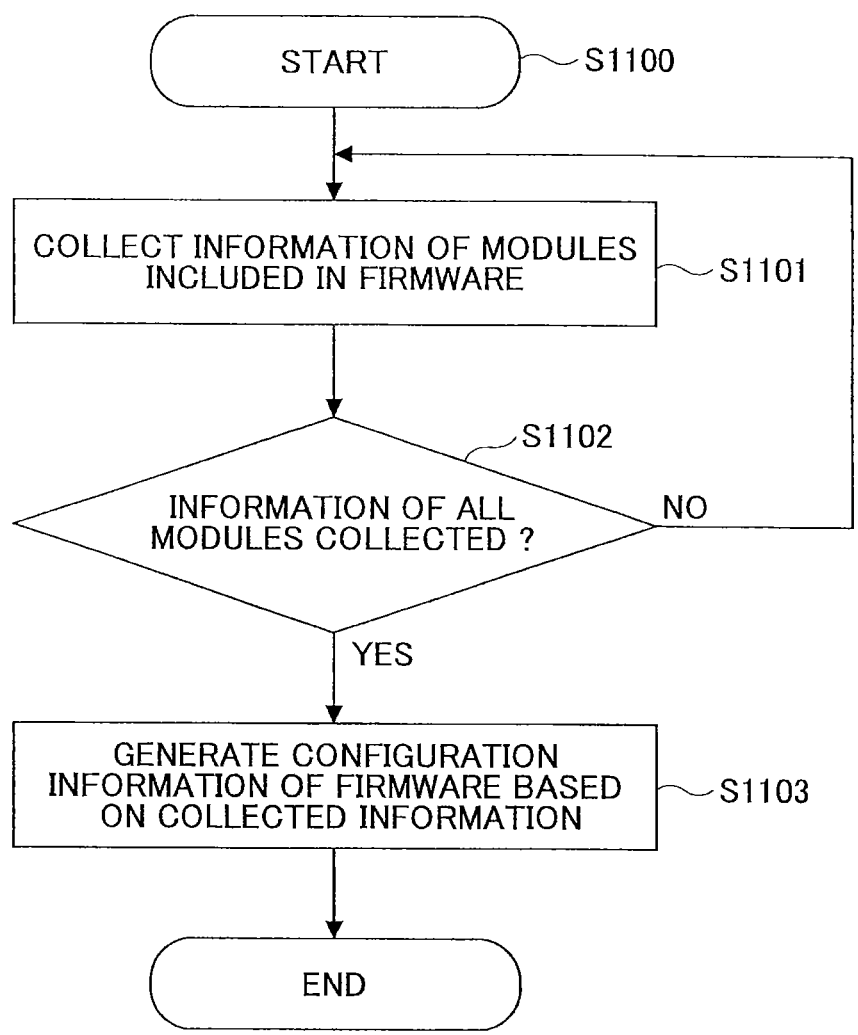
FIG. 4 shows a flowchart of processes carried out by a configuration information generation part according to the first embodiment.

Based on the flowchart of FIG. 4, processes carried out by the configuration information generation part 10 will be described first.

The configuration information generation part 10 starts generating configuration information in appropriate timing (for example, at a time of starting the video output apparatus 100) (step S1100).

That is, first, the video output apparatus 100 collects information concerning module configuration of firmware 110 mounted in the video output apparatus 100 itself (step S1101).

Figure 5:
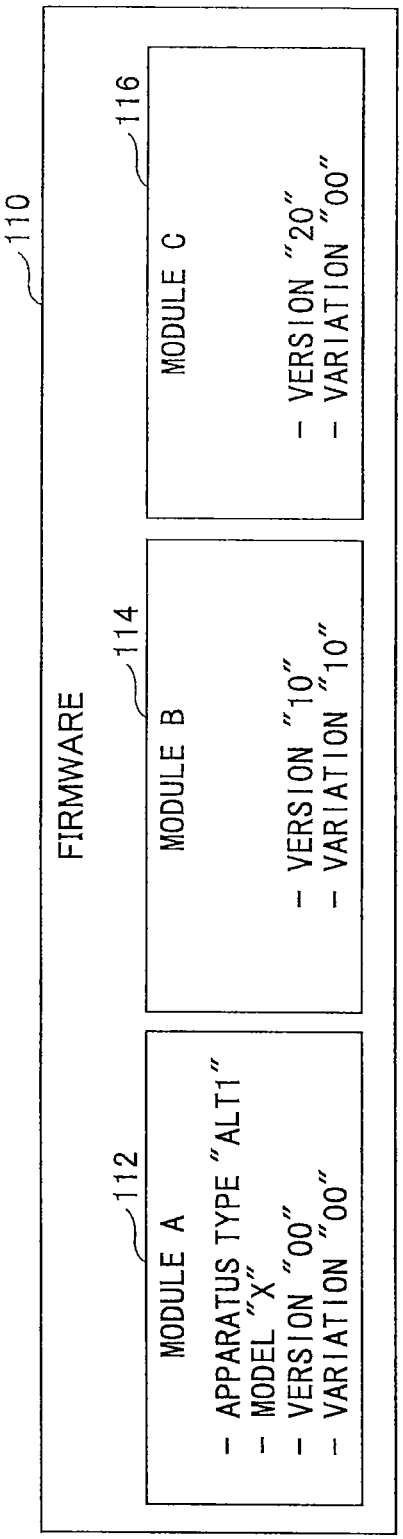
FIG. 5 shows a data structure of firmware according to the first embodiment.

Description will now be made assuming a case where, in the video output apparatus 100, firmware 110 shown in FIG. 5 is mounted, for example.

The firmware 110 of FIG. 5 includes three modules, i.e., a module A (112), a module B (114) and a module C (116).

Each of these modules A, B and C has its own version information "00", "10" and "20", respectively, and its own variation information ("mass-produced" "00" or "custom-ordered" "10").

Noted that, in the case of FIG. 5, the module A (112) further has apparatus type information "ALT1" and model information "X" of the video output apparatus 100.

The configuration information generation part 10 thus collects, from the respective modules A, B and C, the apparatus type information, model information, version information and variation information.

When the collection has been completed (step S1102 YES), the configuration information generation part 10 generates configuration information according to a predetermined generation rule, using the thus collected information (step S1103).

Figure 6:
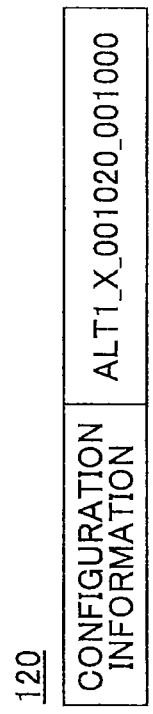
FIG. 6 shows a data structure of configuration information according to the first embodiment.

FIG. 6 shows, as one example, the configuration information thus generated in step S1103.

FIG. 6 shows the information configuration 120 "ALT1_X_001020_001000") generated according to the generation rule ("apparatus type"_"model"_"enumeration of the version information of the respective modules"_"enumeration of the variation information of the respective modules").

Note that the "enumeration of the version information of the respective modules" and the "enumeration of the variation information of the respective modules" are obtained from, in the example of FIG. 5, the respective sets of the version information "00", "10" and "20", and the respective sets of the variation information "00", "10" and "00", respectively.

The configuration information 120 thus generated is stored in the configuration information storage part 11 to be used later.

The firmware information obtaining part 12 generates a firmware ID that is identification information of the firmware 110 according to a predetermined rule using the configuration information 120 thus stored in the configuration information storage part 11.

Thereafter, the firmware information obtaining part 12 issues a firmware information obtaining request including the generated firmware ID to the network relay apparatus 300.

Figure 7:
FIG. 7 shows a data structure of a firmware ID according to the first embodiment.

FIG. 7 shows, as one example, the firmware ID 130 generated by the firmware information obtaining part 12.

FIG. 7 shows the firmware ID 130 "ALT1_X_001000" generated according to the generation rule ("apparatus type-"_"model"_"enumeration of the variation information of the respective modules").

Note that the above-mentioned generation rules for configuration information and a firmware ID are merely examples, the first embodiment is not limited thereto, and other appropriate generation rules may be adopted instead.

The network relay apparatus 300 registers and manages firmware information received from the firmware management server 200, as mentioned above.

Firmware information according to the first embodiment includes the version information of the respective modules included in the latest firmware and location information of the firmware.

Respective sets of firmware information are registered and managed in a manner of being associated with the corresponding firmware IDs.

FIG. 8 shows, as one example, a firmware information management table 2000 that the network relay apparatus 300 has.

In the firmware information management table 2000, as location information, Uniform Resource Locators (URLs) to be used for downloading respective sets of firmware are stored.

When having received the firmware information obtaining request from the video output apparatus 100 (firmware information obtaining part 12), the network relay apparatus 300 searches the firmware information management table 200 using the firmware ID included in the firmware information obtaining request as a key, and returns the firmware information associated with the firmware ID. In the example of FIG. 8, the firmware information associated with the firmware ID 130 "ALT1_X_001000" (indicated by an arrow in FIG. 8) is returned to the video output apparatus 100.

FIG. 9 shows, as one example, the firmware information 140 to be thus returned to the video output apparatus 100.

The firmware information 140 includes a version information part 142 and a location information part 144.

The version information part 142 includes the enumeration "031020" of the respective sets of version information "03", "10" and "20" (see FIG. 8) of the modules A, B and C included in the firmware 110.

The location information part 144 includes location information "http://aaa.co.jp/bbb" of the firmware 110.

Thus, the sequence of processes for obtaining the firmware information 140 has been described.

In the first embodiment, it is preferable that the configuration information generation part 10 repetitively carries out the process of generating configuration information in appropriate timing and periodically updates configuration information. Thereby, even in a case where, for example, a board is replaced in the video output apparatus 100, and thus, a part of the firmware is replaced accordingly, it is possible to obtain the proper latest firmware information.

When the video output apparatus 100 has thus received the firmware information 140 from the network relay apparatus 300, the update possibility determination part 14 then determines whether it is possible to update the firmware based on the received firmware information 140.

Below, the determination process to be carried out by the update possibility determination part 14 will be described using the flowchart shown in FIG. 10.

The update possibility determination part 14 starts the process in response to the fact that the video output apparatus 100 has received the firmware information 140 from the network relay apparatus 300 (step S1200).

First, the update possibility determination part 14 extracts the enumeration "001020" of version information from the configuration information 120 "ALT_X_001020_001000" stored in the configuration information storage part 11 (step S1201).

Next, the update possibility determination part 14 extracts the enumeration "031020" of version information included in the version information part 142 of the firmware information 140 received from the network relay apparatus 300 (step S1202).

Next, the update possibility determination part 14 compares the thus extracted two enumerations of version information, and determines whether both are coincident (step S1203).

As a result, in a case where both are completely coincident (step S1203 YES), the process is finished as it is since the version of the current firmware is latest, and thus, it is not necessary to update it.

On the other hand, in a case where both are not completely coincident (step S1203 NO), it is determined that it is possible to update the current firmware (step S1204).

In the case where it is possible to update the current firmware, the update possibility determination part 14 sends the firmware information 140 to the firmware obtaining part 15 to request it to obtain the latest firmware.

The firmware obtaining part 15 then accesses the firmware management server 200 based on the location information "http://aaa.co.jp/bbb" included in the location information part 144 of the firmware information 140 received from the update possibility determination part 14, and downloads the latest firmware.

Figure 11:
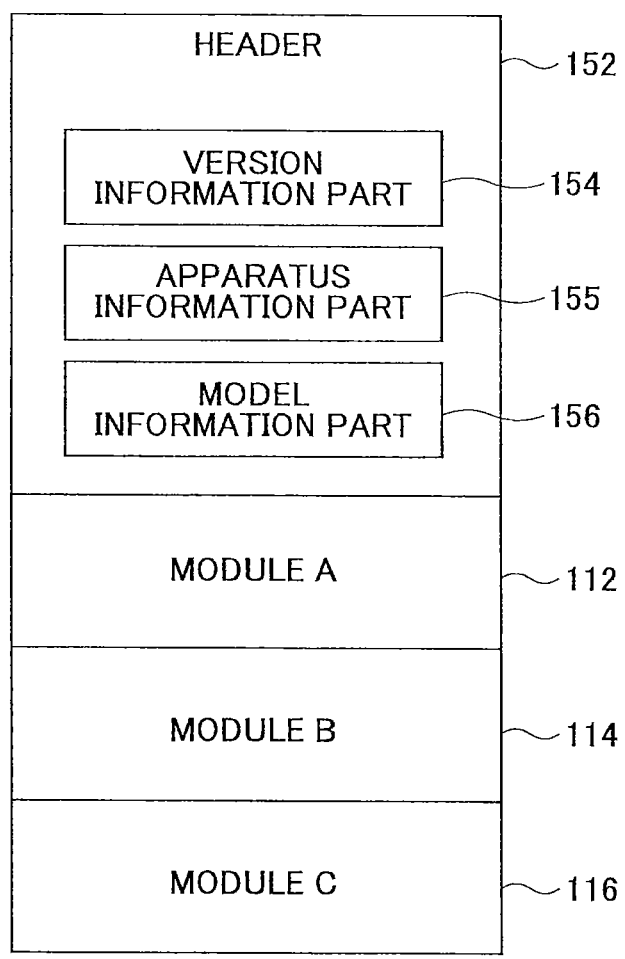
FIG. 11 shows another data structure of the firmware according to the first embodiment.

FIG. 11 shows, as one example, a data structure 150 of the firmware thus downloaded from the firmware management server 200. A header 152 of the firmware 150 includes a version information part 154, an apparatus type information part 155 and a model information part 156.

The version information part 154 includes the enumeration "031020" of the respective sets of version information of the modules A, B and C (112, 114 and 116) included in the firmware 150.

The apparatus type information part 155 includes the apparatus type "ALT1" to which the firmware 150 corresponds.

The model information part 156 includes the model "X" to which the firmware 150 corresponds.

The firmware obtaining part 15 sends the latest firmware thus downloaded from the firmware management server 200 to the firmware update part 16.

The firmware update part 16 receives it, and selects a module(s) to be actually used to carry out update from among all of the modules included in the latest firmware.

Below, this selection process will be described based on a flowchart shown in FIG. 12 to be carried out by the firmware update part 16.

The firmware update part 16 starts the process in response to having received the latest firmware from the firmware obtaining part 15 (step S1300).

First, the firmware update part 16 decomposes the enumeration part "001020" of the version information included in the configuration information 120 "ALT1_X_001020_001000" stored by the configuration information storage part 11 into the sets of version information "00", "10" and "20" of the respective modules (step S1301).

Next, the firmware update part 16 similarly decomposes the enumeration "031020" of the version information included in the version information part 154 of the header 152 of the latest firmware received from the firmware obtaining part 15 into the sets of version information "03", "10" and "20" of the respective modules (step S1302).

Next, the firmware update part 16 compares the sets of version information "00", "10" and "20" obtained in step S1301 with the sets of version information "03", "10" and "20" obtained in step S1302, and determines whether the two sets of version information concerning each of the modules coincide (steps S1303, S1304 and S1305).

Then, the module(s) for each of which the corresponding two sets of version information do not coincide is(are) determined to be used for update (step S1303 "NOT COINCIDENT"→S1304).

Note that, in this example, for the module A, the two sets of version information "00" and "03" are not coincident, and thus, the module A should be updated.

On the other hand, for the modules B and C, the two sets of version information "10" and "10" are coincident, the two sets of version information "20" and "20" are coincident, and thus, it is not possible to update the modules B and C.

Next, the above-mentioned sequence of processes will be described again in a manner of time series using a sequence diagram shown in FIG. 13.

The configuration information generation part 10 generates the configuration information "ALT1_X_001020_001000" concerning the firmware in any timing (step S11), and the configuration storage part 11 stores the generated configuration information (step S12).

The firmware information obtaining condition determination part 13 monitors for an occurrence of an event previously defined as a trigger to be used to obtain the firmware information, and sends an instruction to obtain the firmware information to the firmware information obtaining part 12 in synchronization with a timing at which the event is detected (step S13).

The firmware information obtaining part 12 that has thus received the instruction then obtains the configuration information "ALT1_X_001020_001000" of the video output apparatus 100 from the configuration information storage part 11 (step S14).

After generating the firmware ID "ALT1_X_001000" from the configuration information "ALT1_X_001020_001000" (step S15), the firmware information obtaining part 12 issues a firmware information obtaining request including the generated firmware ID "ALT1_X_001000" to the network relay apparatus 300 (step S16), and obtains the latest firmware information (see FIG. 9) concerning the video output apparatus 100 from the network relay apparatus 300.

The firmware information obtaining part 12 sends the thus obtained firmware information to the update possibility determination part 14, and requests it to determine whether it is possible to update the firmware (step S17).

In response thereto, the update possibility determination part 14 obtains the configuration information "ALT1_X_001020_001000" of the video output apparatus 100 from the configuration information storage part 11 (step S18), and determines whether it is possible to update the firmware based on the determination result as to whether the enumeration "031020" of the sets of version information included in the firmware information obtained from the network relay apparatus 300 and the enumeration "001020" of the sets of version information included in the configuration information "ALT1_X_001020_001000" are coincident (step S19).

In a case of having determined that it is possible to update the firmware, the update possibility determination part 14 sends the firmware information to the firmware obtaining part 15 and requests it to download the firmware (step S20).

In response thereto, the firmware obtaining part 15 accesses the location information "http://aaa.co.jp/bbb" included in the thus received firmware information, and downloads the latest firmware from the firmware management server 200 (step S21).

The firmware obtaining part 15 that has thus downloaded the latest firmware requests the firmware update part 16 to update the current firmware using the latest firmware (step S22).

In response thereto, the firmware update part 16 obtains the configuration information "ALT1_X_001020_001000" from the configuration information storage part 11, and thereafter, selects the module(s) to be actually updated based on the difference between the enumeration "001020" of the sets of version information included in the configuration information "ALT1_X_001020_001000" and the enumeration "031020" of the sets of version information included in the header 152 of the firmware that has been thus downloaded (step S24).

In this example, the difference between the above-mentioned two enumerations "001020" (i.e., "00", "10" and "20") and "031020" (i.e., "03", "10" and "20") of the sets of version information is such that the only first two digits are different between "00" and "03". This means that, as mentioned above, the corresponding sets of version information are different only for the module A. Thus, the module A is selected to be used for update in step S24.

Thus, the sequence of processes for determining whether it is possible to update the firmware and ultimately selecting the module(s) to be used for update have been described.

Next, a sequence of processes to be carried out after it has been determined that it is possible to update the firmware will be described.

When having determined that it is possible to update the firmware, the update possibility determination part 14 notifies the update possible notification part 24 thereof.

When having received this notification, the update possible notification part 24 sends the UI control part 60 an update possible notification.

When having thus received the update possible notification, the UI control part 60 requests the projection control part 70 to project a firmware update possible notification screen page, and the projection part 80 projects the firmware update possible notification screen page on a screen.

Figure 14A:
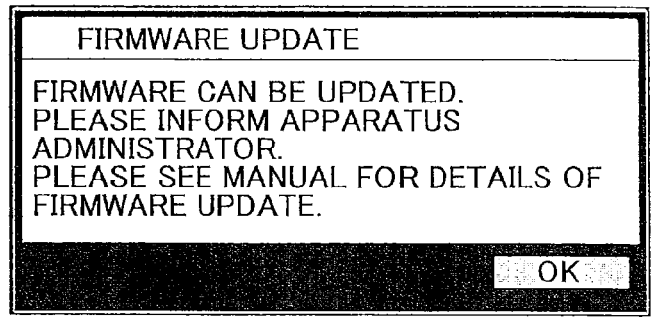
FIGS. 14A, 14B and 14C show UI screen pages according to the first embodiment.

FIG. 14A shows, as one example, the firmware update possible notification screen page 160 thus projected on the screen.

Thus, according to the first embodiment, the user can be automatically informed that the latest firmware has been released to be used to update the current firmware.

When the user has selected "OK" on the thus projected firmware update possible notification screen page 160, the UI control part 60 requests the projection control part 60 to then project a firmware update instruction screen page 162.

Figure 14B:
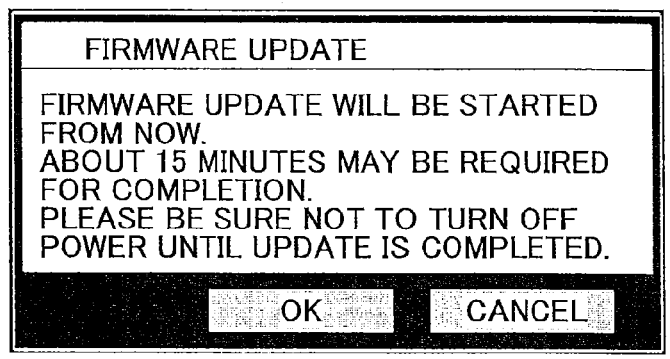

FIG. 14B shows, as one example, the firmware update instruction screen page 162 projected on the screen.

When the user has selected "OK" on the thus projected firmware update instruction screen page 162, the UI control part 60 notifies the update instruction reception part 25 that the user has requested update.

In response thereto, the update instruction reception part 25 notifies the update possible determination part 14 that the user has requested update.

On the other hand, when the user has selected "CANCEL" on the firmware update instruction screen page 162, the UI control part 60 requests the projection control part 70 to project a re-notification setting screen page.

Figure 14C:
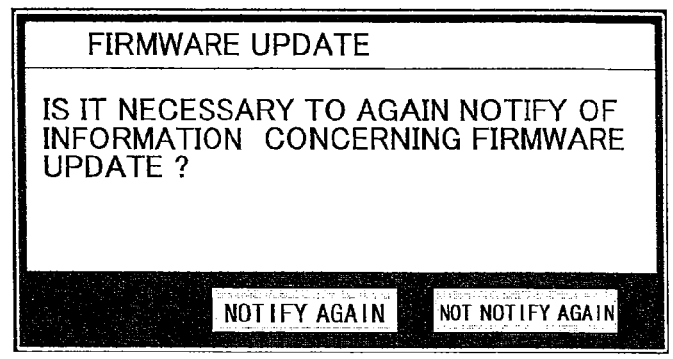

FIG. 14C shows, as one example, the re-notification setting screen page 164 to be projected on the screen.

When the user has selected "NOTIFY AGAIN" or "NOT NOTIFY AGAIN" on the thus projected re-notification setting screen page 164, the contents thus selected are stored and set in the re-notification necessity setting part 23.

Thereafter, the update possibility notification part 24 determines whether it is necessary to send an update possible notification (i.e., whether to notify the user that it is possible to update the firmware) based on the contents thus stored and set in the re-notification necessity setting part 23.

Figure 15:
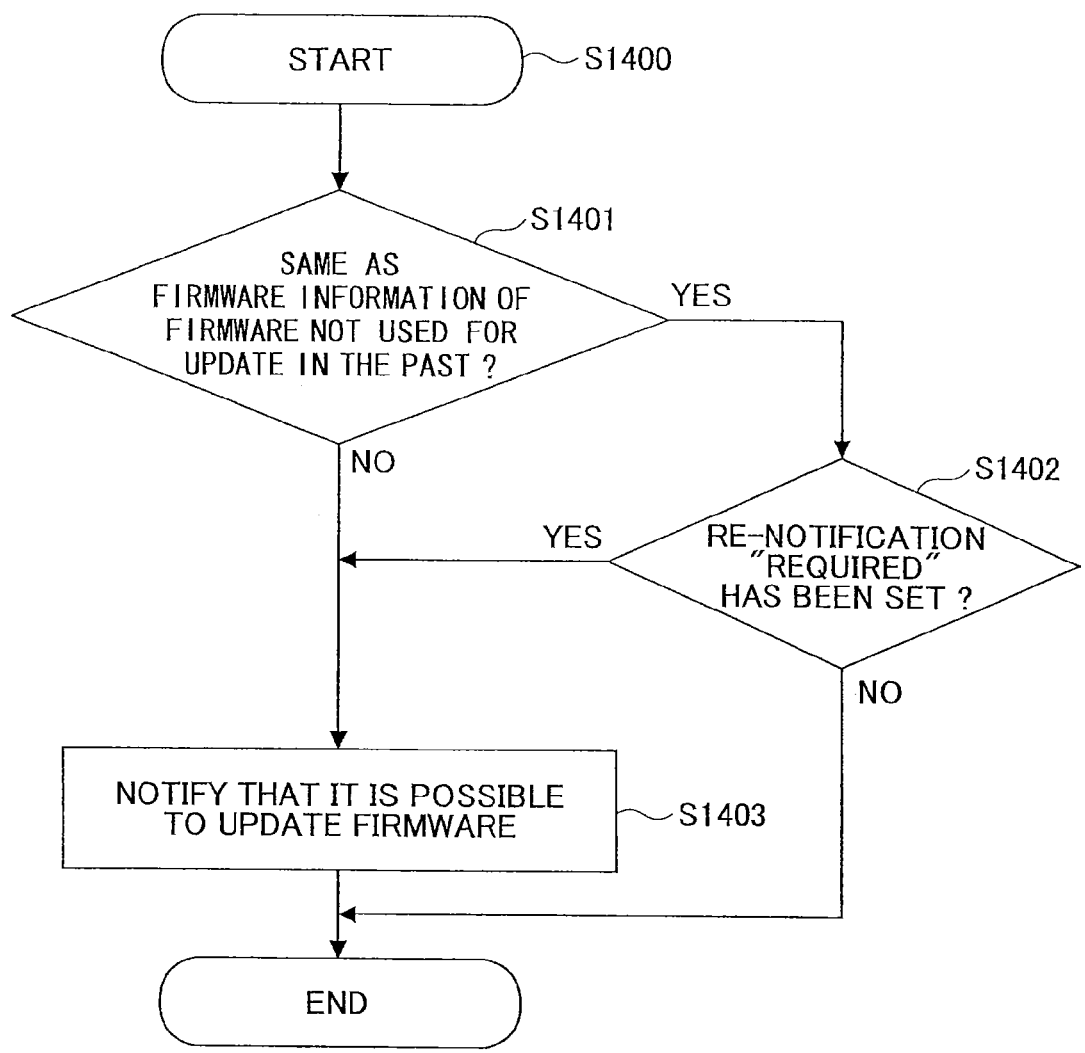
FIG. 15 shows a flowchart of processes carried out by an update possible notification part according to the first embodiment.

Processes of determining, by the update possible notification part 24, whether it is necessary to send the update possible notification will now be described based on a flowchart shown in FIG. 15.

The update possible notification part 24 starts the processes in response to having received the notification indicating that it is possible to update the firmware from the update possibility determination part 14 (step S1400).

The update possible notification part 24 first determines whether the firmware information of the firmware concerning the notification is the same as the firmware information of the firmware for which, in the past, the user has not updated although it has been possible to update. (step S1401).

As a result, in a case where it has been thus determined that the two sets of firmware information are not the same (step S1401 NO), the update possible notification part 24 sends an instruction to the UI control part 60 to display a firmware update possible notification screen page (step S1403).

On the other hand, when it has been determined that the two sets of firmware information are the same (step S1401 YES), the update possible notification part 24 reads the set contents as to whether they indicate "notify again" or "not notify again", from the re-notification necessity setting part 23, and determines whether the thus read set contents indicate "notify again" (i.e., "RE-NOTIFICATION REQUIRED" HAS BEEN SET?") (step S1402).

As a result, in a case where the set contents indicate "notify again" (step S1402 YES), the update possible notification part 24 sends an instruction to the UI control part 60 to display the firmware update possible notification screen page (step S1403).

On the other hand, in a case where the set contents indicate "not notify again" (step S1402 NO), the process is finished as it is.

Thus, the processes of determining, by the update possible notification part 24, whether to notify the user that it is possible to update the firmware have been described.

However, according to the first embodiment, it is also possible to send a notification that it is possible to update the firmware to the outside.

In this case, when having determined that it is possible to update the firmware, the update possibility determination part 14 notifies the outside notification part 21 thereof.

In response thereto, the outside notification part 21 reads the outside notification destination from the notification destination storage part 22, and notifies the read notification destination that it is possible to update the firmware in the video output apparatus 100.

Next, a sequence of processes to be carried out until when actually updating the firmware from when carrying out the update possible notification after determining that it is possible to update the firmware will be described in a manner of time series based on a sequence diagram shown in FIG. 16.

The update possibility determination part 14 determines whether it is possible to update the firmware (step S31). Note that step S31 corresponds to step S19 in FIG. 13 described above.

As a result, in a case where having thus determined that it is possible to update the firmware, the update possibility determination part 14 requests the outside notification part 21 to notify it (step S32).

In response thereto, the outside notification part 21 obtains the designated notification destination (for example, mail address) of the outside (for example, the administrator) from the notification destination storage part 22 (step S33), and notifies the thus obtained notification destination that it is possible to update the firmware (for example, by sending an electronic mail to the administrator) (step S34).

Further, the update possibility determination part 14 requests the update possible notification part 24 to notify the user that it is possible to update the firmware (step S35).

In response thereto, the update possible notification part 24 determines whether the firmware information of the firmware concerning this notification request is the same as the firmware information of the firmware for which, in the past, the user has not updated although it has been possible to update.

As a result, in a case where these two sets of firmware information are the same, the update possible notification part 24 determines whether it is necessary to notify the user that it is possible to update the firmware, by determining the set contents in the re-notification necessity setting part 23 (step S36).

In a case where it is necessary to notify that it is possible to update the firmware, the update possible notification part 24 sends an instruction to the UI control part 60 to notify that it is possible to update the firmware (step S37).

In response thereto, the UI control part 60 requests the projection control part 70 to project the firmware update possible notification screen page (step S38).

The user then selects as to whether to update the firmware on the thus projected firmware update possible notification screen page 160 and the firmware update instruction screen page 162 (see FIGS. 14A and 14B) (step S39).

In response thereto, the UI control part 60 notifies the update instruction reception part 25 of the user's selection result as to whether to update the firmware.

In response thereto, the update instruction reception part 25 notifies the update possibility determination part 14 of the selection result (step S41).

The update possibility determination part 14 then carries out a final determination as to whether to carry out update, based on the thus received selection result (step S42).

As a result, in a case to carry out update, the update possibility determination part 14 requests the firmware update part 16 to carry out update (step S43).

In response thereto, the firmware update part 16 updates a module(s) to be updated (installs the corresponding module(s)) that has(have) been selected in the processes described above (see step S24 in FIG. 13) (step S44).

In this example, the firmware update part 16 selects the module A, to be used for update, for which the version information has been updated from "00" to "03", as mentioned above, and thus, only the module A is installed.

On the other hand, in a case not to carry out update, the firmware information of the firmware for which the user has thus not selected to update although it is possible to update is stored in the update possible notification part 24 (step S45).

Thus, the sequence of processes to be carried out from when carrying out the update possible notification to when actually carrying out update have been described.

Next, processes to be carried out by the firmware information obtaining condition determination part 13 will be described.

As described above, the firmware information obtaining condition determination part 13 monitors for an occurrence of an event (hereinafter, referred to a "trigger event") previously defined as a condition for obtaining the firmware information, and sends an instruction to the firmware information obtaining part 12 to obtain the firmware information in response to a detection of the trigger event.

Below, the trigger event that the firmware information obtaining condition determination part 13 can employ will be described.

According to the first embodiment, it is possible to employ a start-up of the video output apparatus 100 as the trigger event.

In this case, the firmware information obtaining condition determination part 13 responds to a fact that the video output apparatus 100 has been started by sending an instruction to the firmware information obtaining part 12 to obtain the firmware information.

In response to the instruction (corresponding to the instruction in step S13 of FIG. 13), thereafter, the above-described sequence of firmware update processes are carried out (hereinafter, the same manner will be applied).

By such a configuration, firmware information can be obtained together with other information that is obtained when the video output apparatus 100 is started, and thus, it is possible to reduce the processing load to be borne by the firmware management server 200.

Further, according to the first embodiment, it is also possible that the user requests an update of the firmware, and this request is employed as the trigger event.

In this case, the firmware information obtaining condition determination part 13 detects that the update instruction reception part 25 has received a selection result indicating that update is required from the UI control part 60, and, in synchronization with this timing, sends an instruction to the firmware information obtaining part 12 to obtain the firmware information.

Further, according to the first embodiment, it is also possible that the user's operation of pressing a power-off switch of the video output apparatus 100 is employed as the trigger event. Note that the power-off switch may be either a hardware switch or a software switch.

In this case, the firmware information obtaining condition determination part 13 responds to detection of an operation of pressing the power-off switch of the video output apparatus 100 by sending an instruction to the firmware information obtaining part 12 to obtain the firmware information.

In response thereto, the firmware information obtaining part 12 obtains the firmware information from the network relay apparatus 300 during a period of time from the detection of the operation of pressing the power-off switch until the power supply in the video output apparatus 100 is stopped.

Further, according to the first embodiment, it is also possible that a detection of connection of a new device to the video output apparatus 100 is employed as the trigger event.

In this case, the new device connection detection part 42 detects connection of a new device, if any, with which the current firmware is not compatible, and notifies the firmware information obtaining condition determination part 13 of the detection.

The firmware information obtaining condition determination part 13 responds to this notification by sending an instruction to the firmware information obtaining part 12 to obtain the firmware information.

As a specific example, such a case can be cited that, in response to connection of a wireless LAN device to the video output apparatus 100 that does not have a wireless LAN function, the firmware information concerning the latest firmware with which it is possible to use the wireless LAN device in the video output apparatus 100 is obtained.

Further, according to the first embodiment, it is also possible to employ an occurrence of an error as the trigger event.

In this case, the error detection part 44 detects an occurrence of an error, and notifies the firmware information obtaining condition determination part 13 of this fact.

The firmware information obtaining condition determination part 13 responds to this notification by sending an instruction to the firmware information obtaining part 12 to obtain the firmware information.

By such a configuration, it is possible to quickly obtain the firmware information concerning the firmware that can deal with the error, and thus, it is possible to reduce the unavailable time in the video output apparatus 100.

Further, according to the first embodiment, it is also possible to employ the coming of a predetermined date and time as the trigger event.

In this case, a predetermined schedule for updating the firmware is set in the firmware information obtaining date/time detection part 46.

Specifically, a specific date and time, such as "10:00 in 2012/8/10", a specific cycle such as "16:00 every day", "12:00 every Tuesday", or the like, can be set.

The firmware information obtaining date/time detection part 46 monitors the current time, and, when the set date and time have come, notifies the firmware information obtaining condition determination part 13 of this fact.

In synchronization with the notification, the firmware information obtaining condition determination part 13 sends an instruction to the firmware information obtaining part 12 to obtain the firmware information.

By thus providing such a configuration that the user can freely designate a schedule of updating the firmware, the convenience is improved.

Thus, the firmware information obtaining condition determination part 13 has been described.

Next, user authentication concerning downloading firmware will be described. Note that a UI concerning user authentication is provided by the UI control part 60. Note that for the sake of convenience, description for the UI control part 60 will be omitted.

Figure 17:
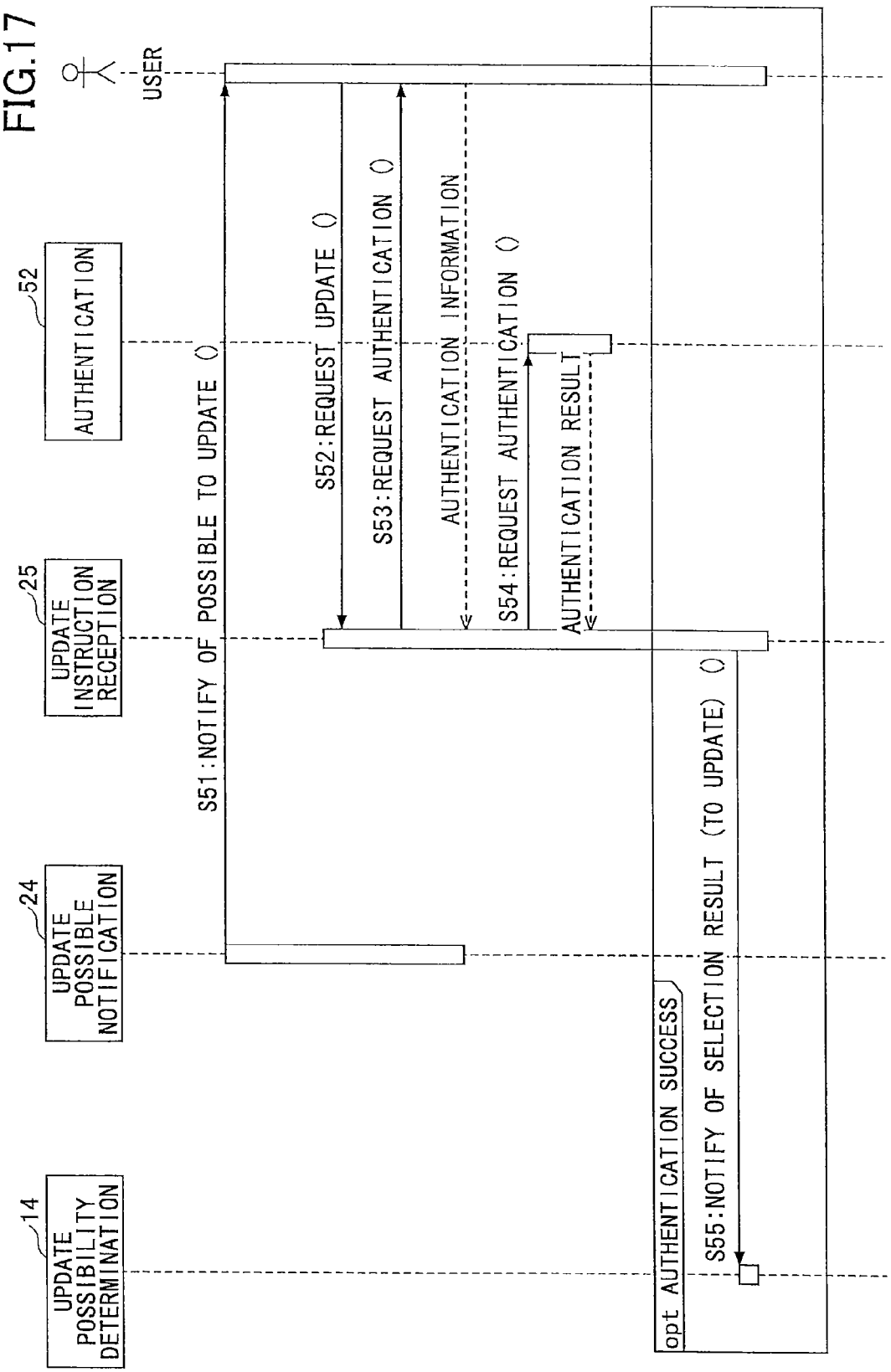

Based on a sequence diagram shown in FIG. 17, a first mode of user authentication concerning downloading firmware will now be described.

Figure 16:
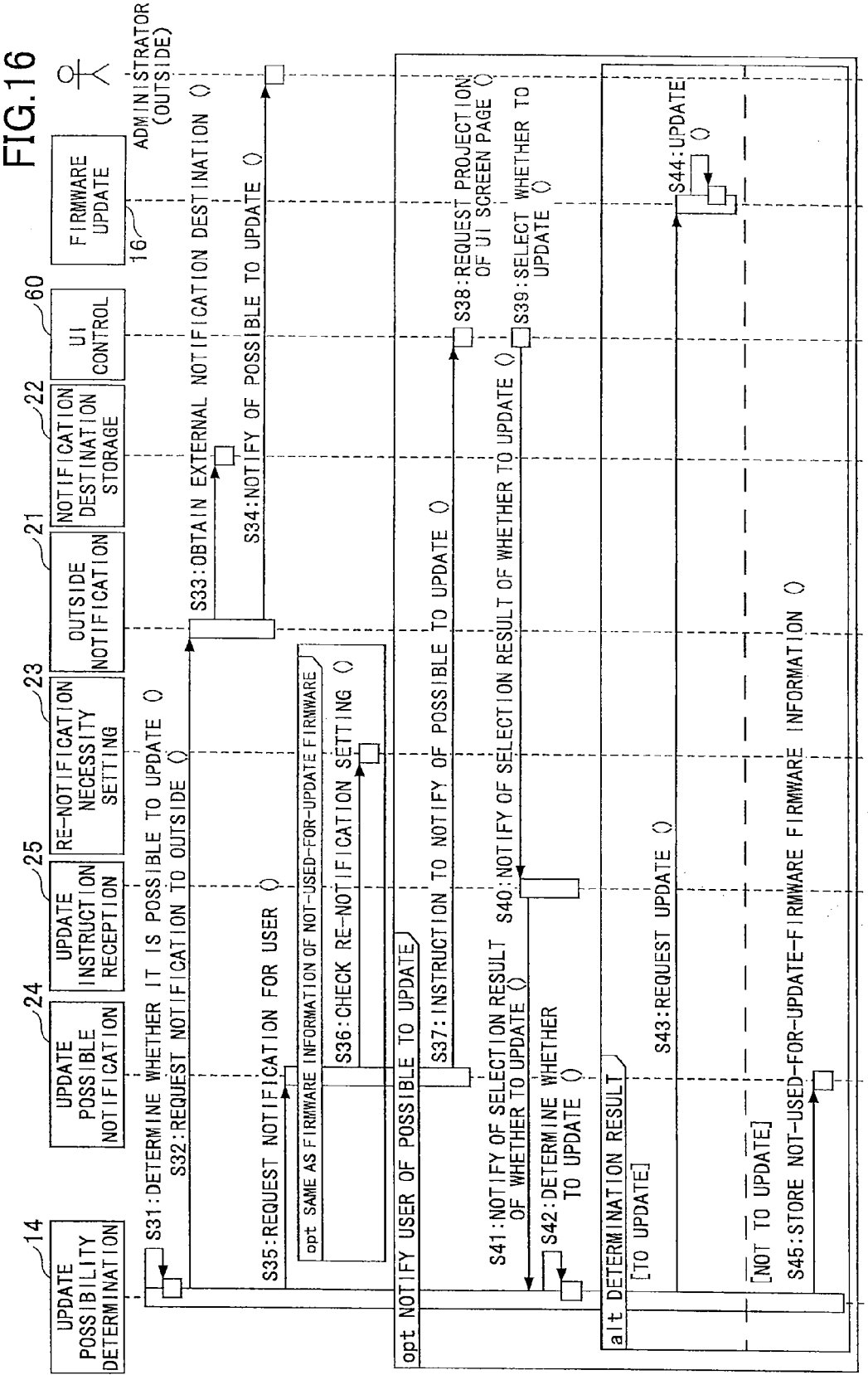
FIGS. 16, 17, 18, 19, 20 and 21 show sequence diagrams of processes carried out by the video output apparatus according to the first embodiment.

The update possibility notification part 24 notifies the user that it is possible to update the firmware (step S51) (corresponding to step S37 in FIG. 16).

Thereafter, the update instruction reception part 25 receives an update request from the user (step S52), and, in response thereto, requests authentication information from the user (step S53).

In response thereto, the user inputs and returns predetermined authentication information (user name, password and/or the like).

The update instruction reception part 25 requests authentication from the authentication part 52 based on the authentication information thus received from the user (step S54).

In response thereto, the authentication part 52 carries out authentication based on the received authentication information, and returns the authentication result (success or failure) to the update instruction reception part 25.

The update instruction reception part 25 then notifies the update possibility determination part 14 of the user's update necessity selection result "to update" (i.e., update is required) in a case where the authentication has succeeded (step S55).

Figure 18:
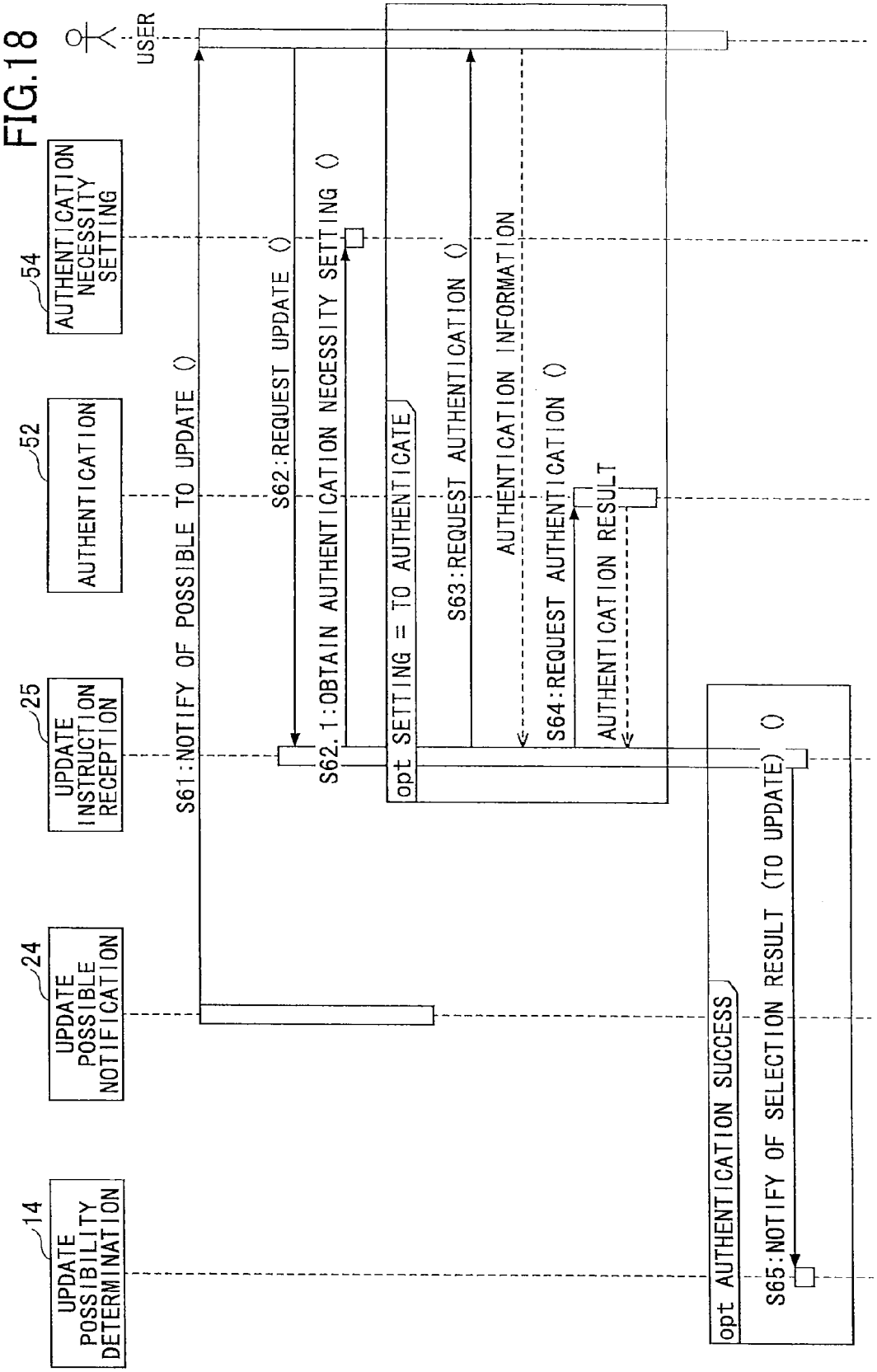

Next, based on a sequence diagram shown in FIG. 18, a second mode of user authentication concerning downloading firmware will now be described.

According to the second mode, the authentication necessity setting part 54 stores information as to whether to carry out user authentication in downloading firmware as a set value.

The update possibility notification part 24 notifies the user that it is possible to update the firmware (step S61) (corresponding to step S37 in FIG. 16).

Thereafter, the update instruction reception part 25 receives an update request from the user (step S62), and, in response thereto, obtains the set value as to whether to carry out authentication from the authentication necessity setting part 54 (step S62.1).

As a result, in a case where the set value indicates "to authenticate" (i.e., authentication is required), the processes in steps S63, S64 and S65 (the same as those in steps S53, S54 and S55 described above based on FIG. 17) are carried out.

Note that, in the second mode, setting a set value as to whether to carry out authentication may be carried out for each of the users separately.

Figure 19:
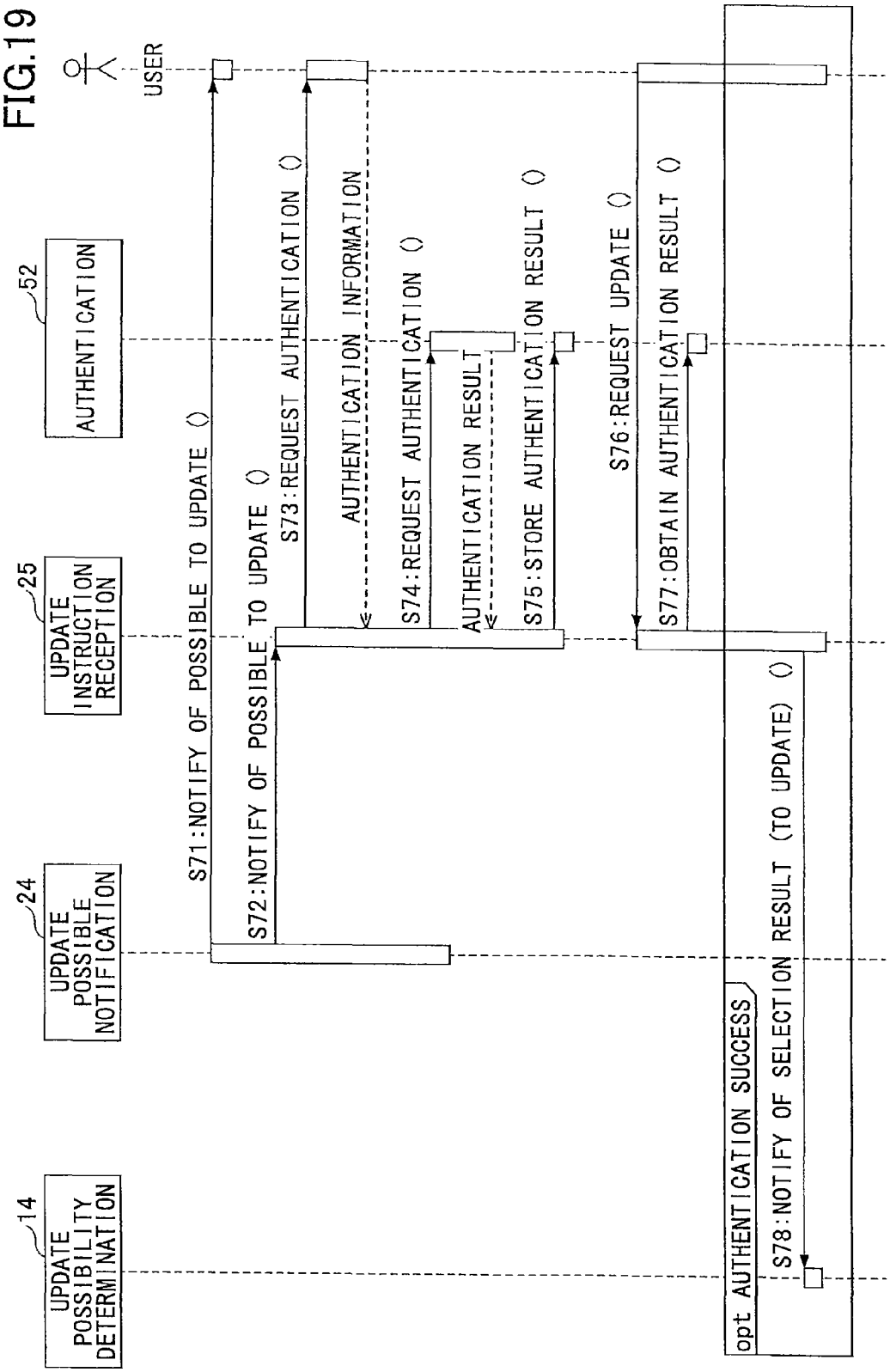

Next, based on a sequence diagram shown in FIG. 19, a third mode of user authentication concerning downloading firmware will now be described.

The update possibility notification part 24 notifies the user that it is possible to update the firmware (step S71) (corresponding to step S37 in FIG. 16), and also, notifies the update instruction reception part 25 that it is possible to update firmware (step S72).

In response to reception of the notification indicating that it is possible to update firmware from the update possibility determination part 24, the update instruction reception part 35 requests authentication information from the user (step S73).

In response thereto, the user inputs and returns predetermined authentication information (user name, password, and/or the like).

The update instruction reception part 25 then requests authentication from the authentication part 52 based on the authentication information thus received from the user (step S74).

In response thereto, the authentication part 52 carries out authentication based on the received authentication information, and returns the authentication result (success or failure) to the update instruction reception part 25.

In response thereto, the update instruction reception part 25 requests the authentication part 52 to store the authentication result (step S75).

Thereafter, when having received an update request from the user (step S76), the update instruction reception part 25 obtains the stored authentication result from the authentication part 52 (step S77).

The update instruction reception part 25 then notifies the update possibility determination part 14 of the user's update necessity selection result "to update" (update is required) in a case where the authentication has succeeded (step S78).

According to the third mode described above, it is possible to carry out authentication previously. Therefore, for example, as a result of the administrator previously carrying out authentication, it is possible to update firmware in any timing thereafter.

Further, according to the first embodiment, it is also possible to provide a configuration in which the firmware obtaining part 15 requests user authentication from the authentication part 52 immediately before starting downloading the firmware in the latest version.

In this case, since the authentication part 52 carries out authentication immediately before download of the firmware, it is possible to surely authenticate the person who has requested the download.

Thus, user authentication concerning downloading firmware has been described.

Next, timing control concerning downloading firmware will be described.

Figure 20:
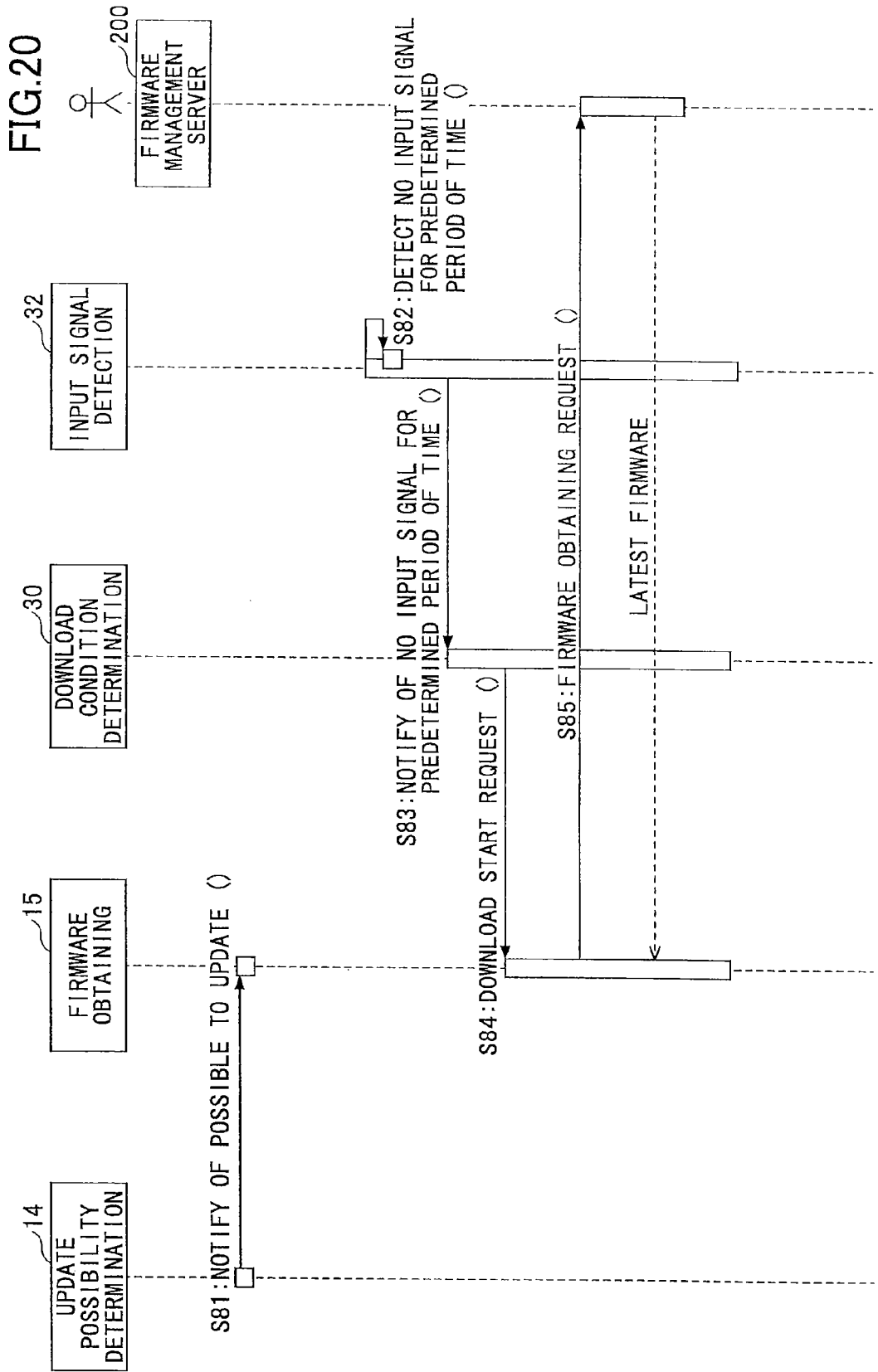

Based on a sequence diagram shown in FIG. 20, a first mode of timing control concerning downloading firmware will now be described.

The update possibility determination part 14 requests the firmware obtaining part 15 to download firmware (step S81) (corresponding to step S20 in FIG. 13).

However, according to the first mode, the firmware obtaining part 15 does not carry out downloading immediately after receiving the request, and waits for a start request from the download condition determination part 30.

On the other hand, at the time of having detected that an input signal has not been sent to the projection part 80 for the predetermined period of time (step S82), the input signal detection part 32 notifies the download condition determination part 30 of this fact (step S83).

In response to reception of the notification, the download condition determination part 30 requests the firmware obtaining part 15 to start downloading firmware (step S84).

In response to the start request, the firmware obtaining part 15 accesses the firmware management server 200 and downloads the latest firmware therefrom (step S85).

In a case where an input signal has not been sent to the projection part 80 as mentioned above, it can be determined that the video output apparatus 100 has not been used. According to the first mode, it is possible to download the latest firmware by effectively using such an unoccupied time.

Figure 21:
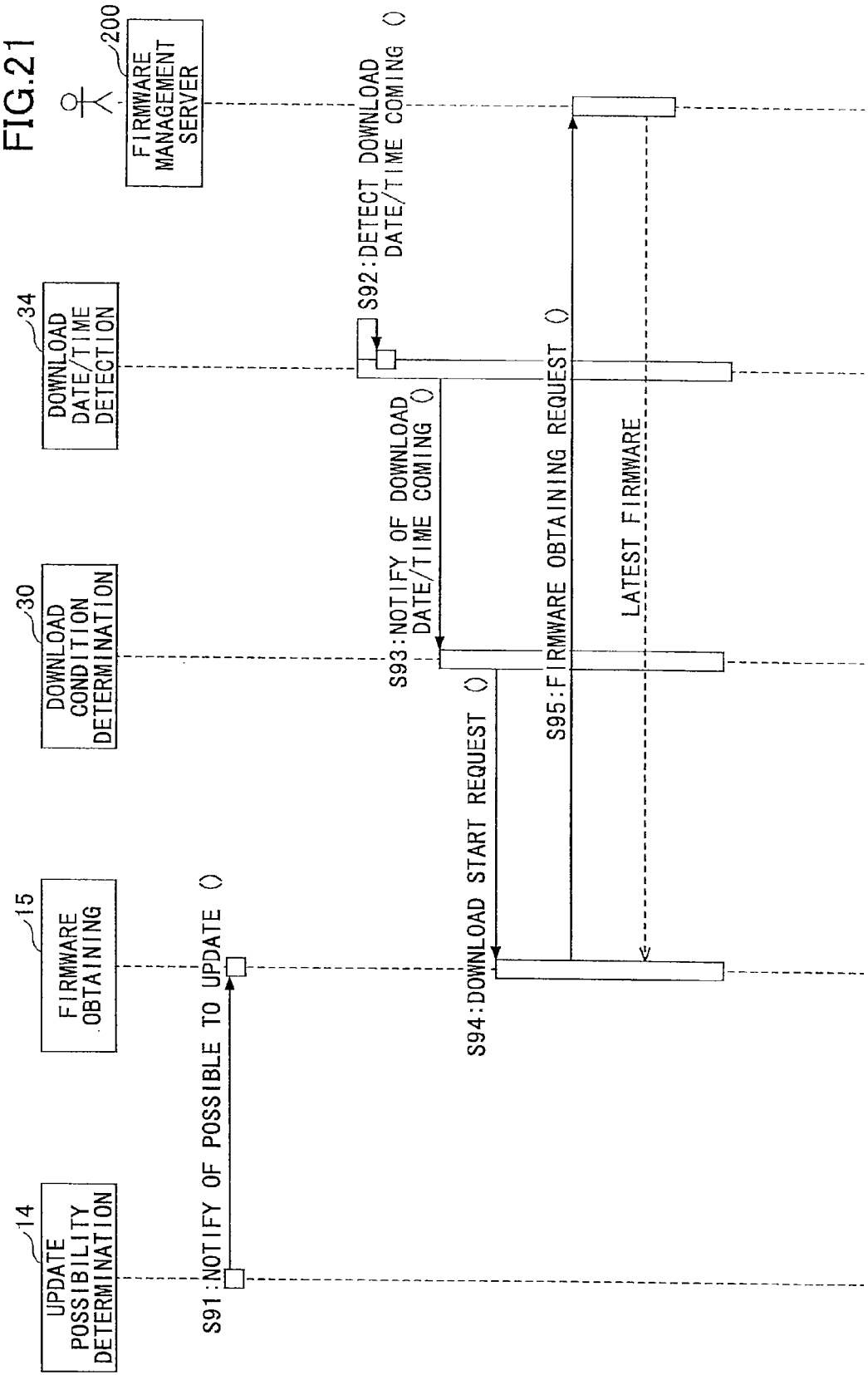

Next, based on a sequence diagram shown in FIG. 21, a second mode of timing control concerning downloading firmware will now be described.

The update possibility determination part 14 requests the firmware obtaining part 15 to download firmware (step S91) (corresponding to step S20 in FIG. 13).

Also according to the second mode, the firmware obtaining part 15 does not carry out downloading immediately after receiving the request, and waits for a start request from the download condition determination part 30.

According to the second mode, a predetermined schedule for downloading firmware is previously set in the download date/time detection part 34.

Specifically, a specific date and time, such as "10:00 in 2012/8/10", a specific cycle such as "16:00 every day", "12:00 every Tuesday", or the like, can be set.

At the time of having detected the coming of the set date and time (step S92), the download date/time detection part 34 notifies the download condition determination part 30 of this fact (step S93).

In response to reception of this notification, the download condition determination part 30 issues a start request for downloading to the firmware obtaining part 15 (step S94).

In response to the start request, the firmware obtaining part 15 accesses the firmware management server 200 and downloads the latest firmware therefrom (step S95).

According to the second mode, it is possible to download the latest firmware by effectively using an unoccupied time, by, for example, designating a lunch break or a time other than business hours as a time to download firmware to be set in the download date/time detection part 34.

Furthermore, according to the first embodiment, it is also possible to provide a configuration by which, in response to detection of a fact that the power-off switch on the video output apparatus 100 has been pressed, the firmware obtaining part 15 accesses the firmware management server 200 and downloads the latest firmware during the period of time until the power supply in the video output apparatus 100 is stopped after the power-off switch on the video output apparatus 100 was pressed.

By thus providing the configuration by which the firmware is automatically updated at the timing at which the user has finished using the video output apparatus 100, a bother about updating firmware while using the video output apparatus 100 can be avoided, and thus, the convenience is improved.

Thus, timing control concerning downloading firmware has been described.

Next, one example of a design variation in the above-described first embodiment will be described.

FIG. 22 shows, in another example, a data structure of firmware information 170.

The firmware information 170 includes a version information part 172 and a location information part 174.

The version information part 172 includes an enumeration "031020" of the respective sets of version information of the modules A, B and C included in the firmware 110.

The location information part 174 includes location information of the firmware 110. The location information part 174 includes respective sets of location information unique to the respective modules A, B and C included in the firmware 110.

As shown in FIG. 22, in this example, the respective modules A, B and C included in the firmware have the unique locations.

Figure 23:
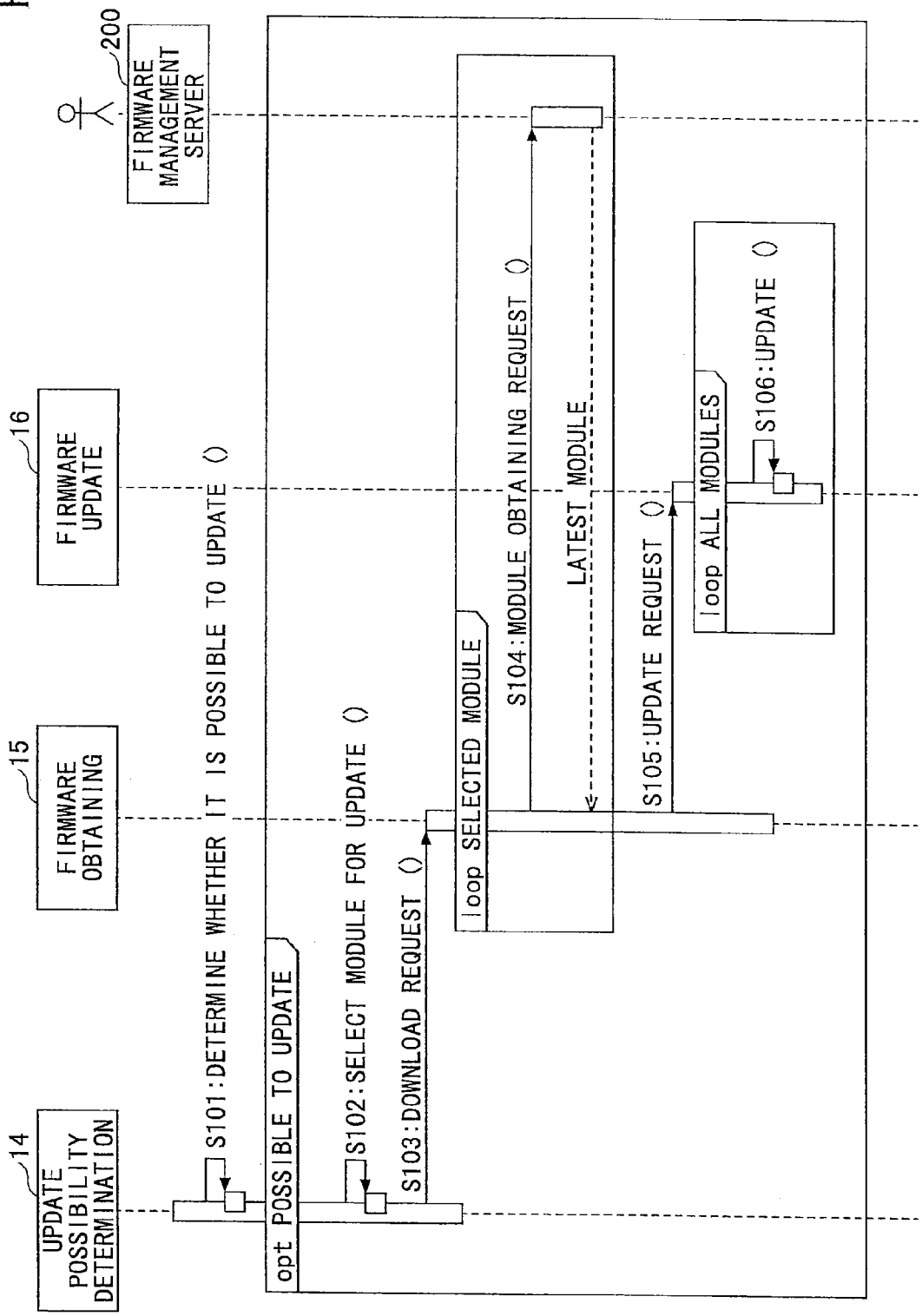
FIG. 23 shows a sequence diagram of processes carried out by the video output apparatus in the design variation in the first embodiment.

Based on a sequence diagram shown in FIG. 23, remote update of firmware for a case where the respective modules of the firmware have the unique locations will now be described.

Figure 10:
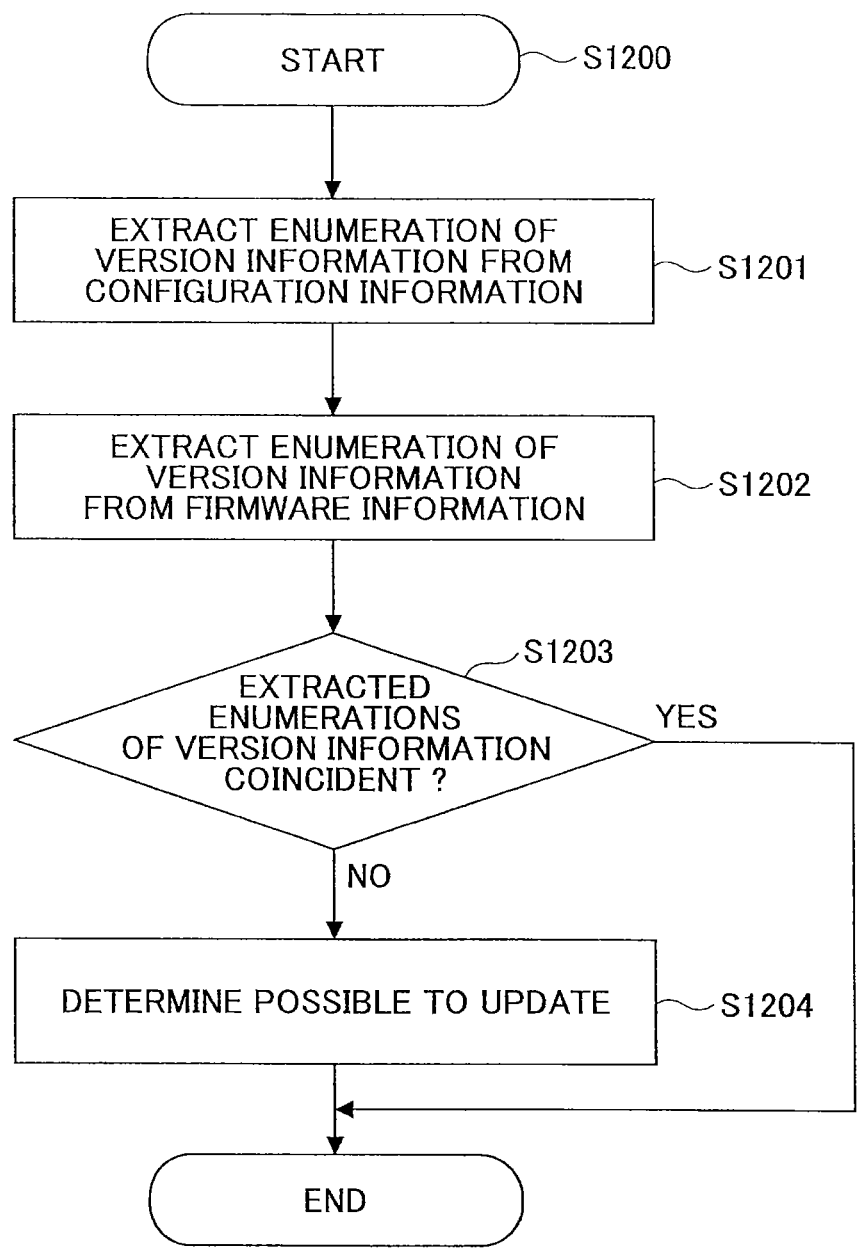
FIG. 10 shows a flowchart of processes carried out by an update possibility determination part according to the first embodiment.

The update possibility determination part 14 determines whether it is possible to update firmware (step S101) (see the flowchart shown in FIG. 10, for example).

Figure 12:
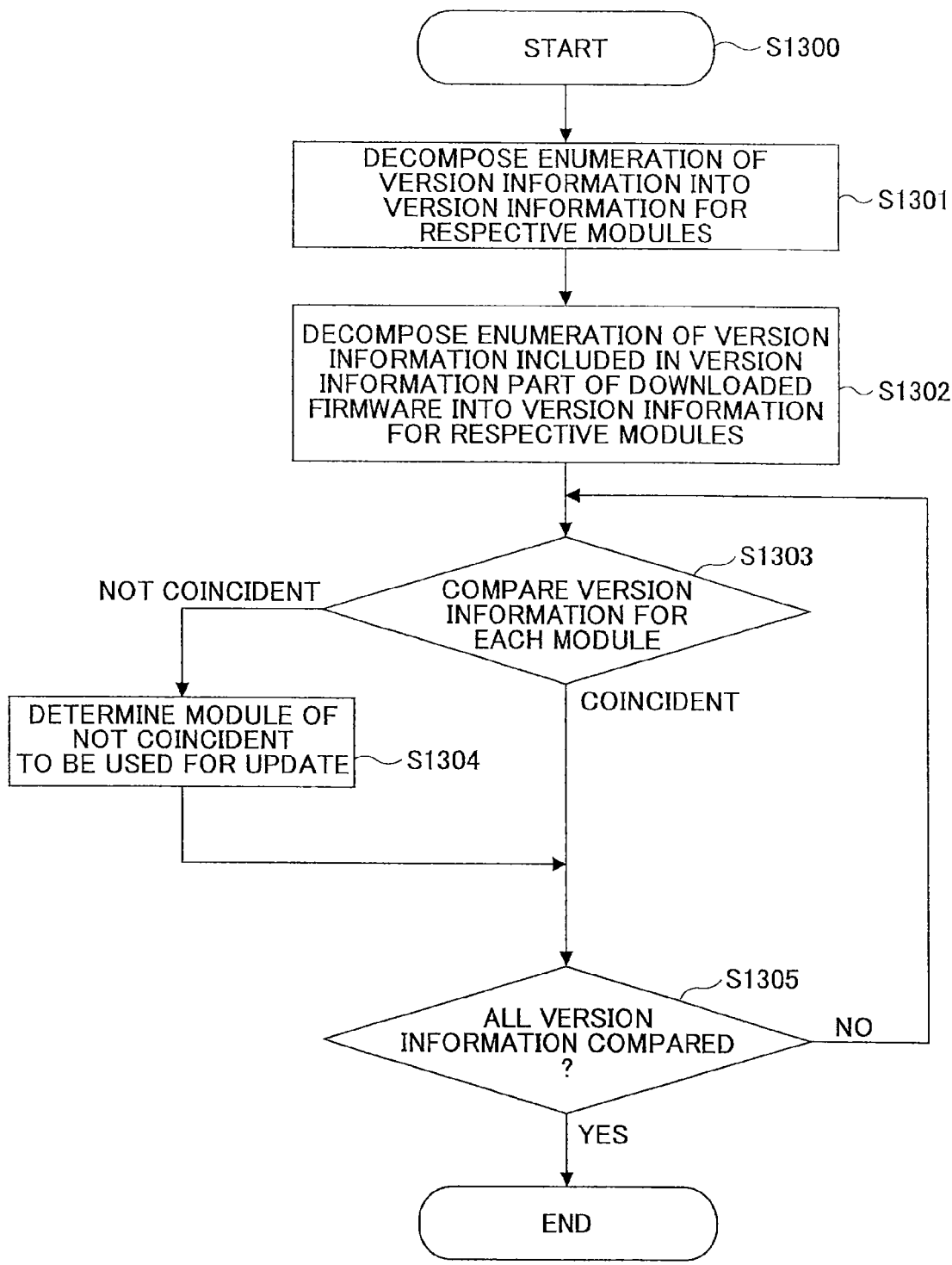
FIG. 12 shows a flowchart of processes carried out by a firmware update part according to the first embodiment.

Then, in a case of having determined that it is possible to update firmware, the update possibility determination part 14 determines a module(s) to be used for update (step S102) in the same procedure as one described above that the firmware update part 16 carries out (see the flowchart shown in FIG. 12, for example).

Specifically, the version information (for example, the enumeration "001020" of the respective sets of version information) included in the configuration information in the video output apparatus 100 is compared with the enumeration "031020" of the respective sets of version information 172 included in the firmware information 170. Thus, a module(s) to be used for update is(are) determined based on the difference between these two sets of enumerations.

Next, the update possibility determination part 14 sends the firmware information 170 to the firmware obtaining part 15, and requests it to download the firmware (step S103). At this time, the update possibility determination part 14 designates the module(s) to be used for update determined in step S102 as the argument.

The firmware obtaining part 15 that has received this request then accesses the firmware management server 200 based on the location information of the module(s) to be used for update designated as the argument as mentioned above, and downloads only the module(s) to be used for update (step S104).

The firmware obtaining part 15 that has thus downloaded the module(s) to be used for update then requests the firmware update part 16 to update firmware (step S105). At this time, as the argument, the module(s) to be used for update is(are) designated.

In response thereto, the firmware update part 16 installs only the module(s) to be used for update (step S106).

By thus providing such a configuration, it is possible to reduce the download size required for updating firmware, and thus, it is possible to reduce the period of time required for the update.

Note that, in this case, the firmware update part 16 does not need to carry out the processes of determining a module (s) to be used for update since the update possibility determination part 14 carries out the processes of determining a module(s) to be used for update as mentioned above.

The respective functions of the above-described first embodiment and design variation therein can be implemented by a computer executable program(s) written in "C" programming language, an object oriented programming language such as "C++", "C#" or "Java" (registered trademark), or the like.

The program(s) according to the first embodiment and design variation therein can be distributed after being stored in a computer readable recording medium such as a hard disk drive, a CD-ROM, MO, DVD, flexible disk, EEPROM, EPROM or the like, and also, can be transmitted via a network in such a format that another computer can execute the program(s).

Figure 24:
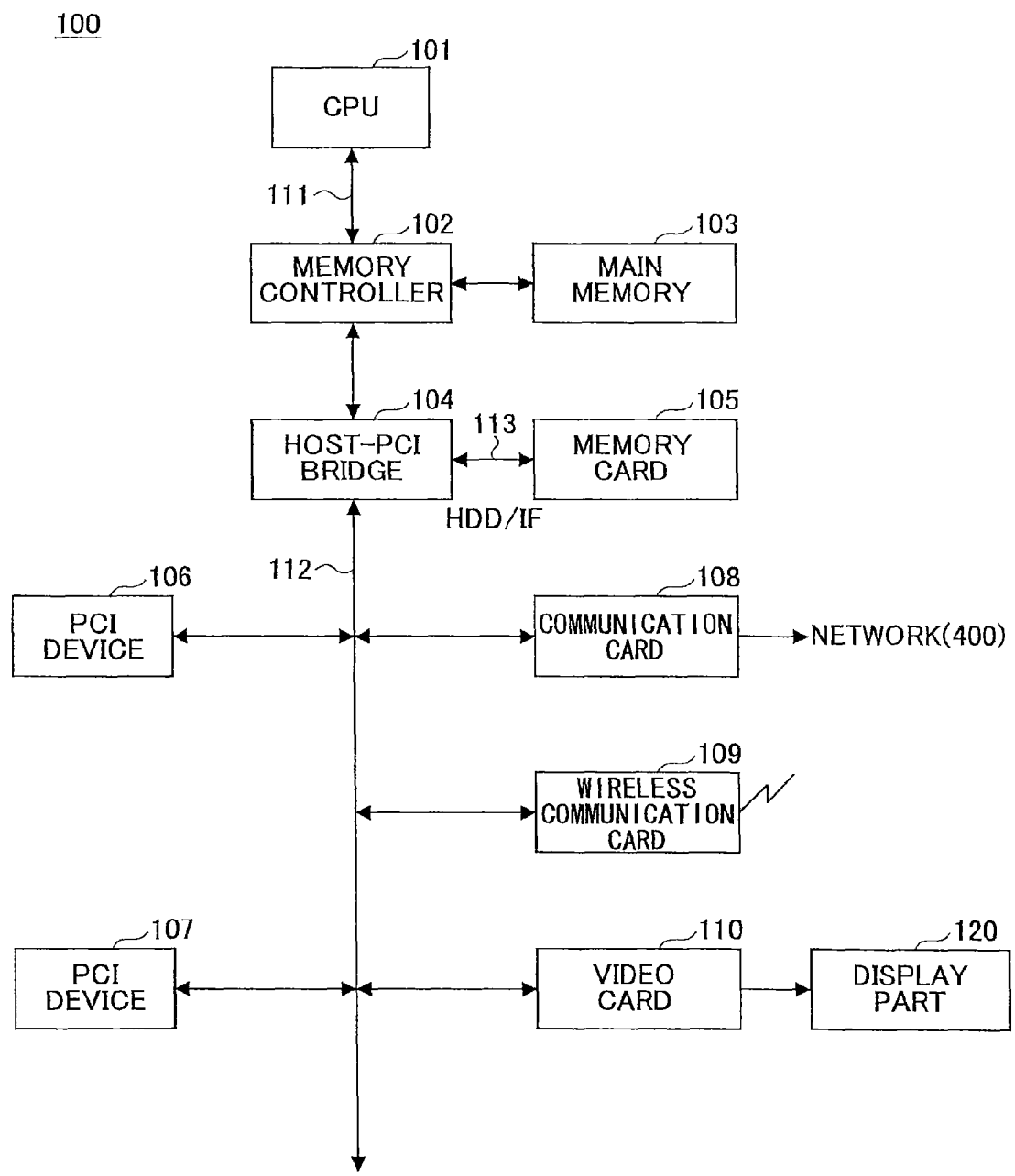
FIG. 24 shows a hardware diagram of one example of the video output apparatus according to the first embodiment.

FIG. 24 shows a hardware diagram of one example of the video output apparatus 100 according to the first embodiment.

As shown in FIG. 24, each of the video output apparatuses 100 includes a CPU 101, a memory controller 102, a main memory 103 and a host-Peripheral Component Interconnect (PCI) bridge 104.

The memory controller 102 is connected with the CPU 101, the main memory 103 and the host-PCI bridge 104 by a host bus 311.

The CPU 101 carries out overall control of the video output apparatus 100.

The memory controller 102 controls reading to and writing from the main memory 103.

The main memory 103 is a system memory to be used to store the program(s) and data; to used as a memory in which the program(s) and data are expanded; to be used as a drawing memory; and so forth.

Further, the main memory 103 includes an EEPROM or the like in which firmware is installed. The firmware in the main memory 103 can be updated by the firmware update part 16 as described above.

The host-PCI bridge 104 is used to connect the video output apparatus 100 with a peripheral device, a PCI device and/or the like.

The host-PCI bridge 104 is used to connect the video output apparatus 100 with a memory card 105 by a HDD I/F 113.

Further, the host-PCI bridge 104 is used to connect the video output apparatus 100 with PCI devices 106 and 107 by a PCI bus 112.

Further, the host-PCI bridge 104 is used to connect the video output apparatus 100 with a communication card 108, a wireless communication card 109 and a video card 110 by the PCI bus 112 and PCI slots (not shown).

The memory card 105 is used as a boot device for an OS.

The communication card 108 and/or the wireless communication card 109 are used to connect the video output apparatus 100 with the network 400.

The video card 110 is used to project images (including the various screen pages described above) on the screen through a display part 120 by outputting a video signal(s) to the display part 120.

The display part 120 outputs the images by displaying them or projecting them in a magnified manner on the screen based on the video signal(s).

Note that the above-mentioned program(s) to be used to implement the respective functions of the functional parts described above using FIG. 3 is(are), as the firmware, stored (installed) in the above-mentioned EEPROM or the like, is(are) executed by the CPU 101, and thus, the CPU 101 implements these respective functions of the functional parts. Further, the network I/F shown in FIG. 3 may include the communication card 108 and the wireless communication card 109; and the UI control part 60, the projection control part 70 and the projection part 80 may include the video card 110 and the display part 120.

According to the first embodiment and design variation therein, it is possible to provide the information processing apparatuses and the network systems in which it is possible to update firmware remotely.

Although the information processing apparatuses and the network systems have been described above by the first embodiment and design variation therein, the present invention is not limited to the first embodiment and design variation therein, and further variations and modifications may be made without departing from the scope of the present invention.

For example, it is also possible that a user's instruction to update firmware is employed as the trigger event for obtaining firmware information. In this case, the user can obtain firmware release information in desired timing.

Further, it is also possible to provide a configuration by which the firmware obtaining part 15 downloads the latest firmware immediately after the update possibility determination part 14 has determined that it is possible to update firmware. In this case, it is possible to promptly update firmware.

Further, it is also possible to provide a configuration in the firmware information obtaining part 12 such that, in a case where firmware has not been downloaded even when a predetermined period of time has elapsed since firmware information was obtained, the firmware information obtaining part 12 again obtains firmware information from the network relay apparatus 300.

In this case, even when a considerable period of time has elapsed during a period of time until firmware is actually downloaded after existence of firmware that can be used for update has been reported, it is possible to download newer firmware that has been released during the period of time.

Note that, although the video output apparatuses 100 have been described by the first embodiment and deign variation therein, the scope of the present invention to which the present invention is applicable is not limited thereto.

The present invention can be applied to any other types of information processing apparatuses in which firmware is mounted (installed).

Furthermore, as long as the advantageous effects of the present invention are obtained, any other configurations are included in the scope of the present invention, in such a scope of embodiments that the person skilled in the art can devise.

Furthermore, the system configuration of the network system 1000 in which, according to the first embodiment, the video output apparatuses 100, the firmware management server 200 and the network relay apparatus 300 are connected, as shown in FIG. 1, and each of the video output apparatuses has the respective functional parts, as shown in FIG. 3, is not limited thereto. Other various system configurations can be provided as other embodiments depending on particular purposes.

For example, one or more of the functional parts included in the video output apparatuses 100 as shown in FIG. 3 in the first embodiment may be instead included in an other apparatus(es) and/or server(s) also connected with the video output apparatuses 100, the firmware management server 200 and/or the network relay apparatus 300 by the network 400, in the network system 1000 shown in FIG. 1. The other apparatus(es) and/or server(s) may include one(s) newly added to the network system 1000, the firmware management server 200 and/or the network relay apparatus 300. For example, the authentication parts 52 shown in FIG. 3 may be removed from the video output apparatuses 100, and instead, an authentication server may be additionally included in the network system 1000. In this case, the authentication server has an authentication function corresponding to the authentication functions that the authentication parts 52 of the respective video output apparatuses 100 have in the first embodiment. Then, the respective video output apparatuses 100 request user authentication from the authentication server.

The present patent application is based on and claims the benefit of priority of Japanese Priority Application No. 2012-245044 filed on Nov. 7, 2012, the entire contents of which are hereby incorporated herein by reference.

What is claimed is:

1. An information processing apparatus comprising:
firmware that includes a plurality of modules and is mounted in the information processing apparatus; and
one or more processors configured to
store configuration information that includes sets of version information of the respective modules included in the firmware;
obtain, based on the configuration information, from an external system, firmware information that includes sets of version information of respective modules of firmware in a latest version;
perform a first comparison of the overall sets of version information included in the configuration information with the overall sets of version information included in the firmware information, and, in a case where the overall sets of version information in the configuration information are not coincident with the overall sets of version information in the firmware information, determine that it is possible to update the firmware in the information processing apparatus;
in response to making the determination based on the result of the first comparison, download, from the external system, the firmware in the latest version corresponding to the firmware in the information processing apparatus for which the one or more processors has determined that it is possible to update, the downloaded firmware including a separate latest version of each of the respective modules included on the information processing apparatus; and
after downloading the firmware in the latest version, make a second comparison of version information of each the respective modules included in the downloaded firmware in the latest version with version information of each of the corresponding respective modules included in the configuration information, and update only a module of the firmware in the information processing apparatus for which the version information in the downloaded firmware is different from the version information in the configuration information,
wherein the one or more processors are configured to detect the coming of a previously set date and time for obtaining the firmware information, the previously set date and time being set by a user of the information processing apparatus,
the one or more processors are configured to determine whether a firmware information obtaining condition has been satisfied, the firmware information obtaining condition being the coming of the date and time for obtaining the firmware information, and
the one or more processors obtains the firmware information from the external system when the firmware information obtaining condition has been satisfied.

2. The information processing apparatus as claimed in claim 1,
the one or more processors being further configured to dynamically generate the configuration information and store the generated configuration information.

3. The information processing apparatus as claimed in claim 1, the one or more processors is configured to provide a UI for, in a case where the one or more processors has determined that it is possible to update the firmware in the information processing apparatus, notify a user that it is possible to update the firmware in the information processing apparatus, and receiving an instruction from the user to update the firmware in the information processing apparatus.

4. The information processing apparatus as claimed in claim 1, wherein
the firmware information obtaining condition is start-up of the information processing apparatus.

5. The information processing apparatus as claimed in claim 1, wherein
the firmware information obtaining condition is receipt of an instruction from a user to update the firmware in the information processing apparatus.

6. The information processing apparatus as claimed in claim 1, wherein
the firmware information obtaining condition is detection of pressing, by a user, a power-off switch in the information processing apparatus, and
the one or more processors obtains the firmware information from the external system during a period of time until the power supply in the information processing apparatus is stopped since the detection of pressing, by the user, the power-off switch.

7. The information processing apparatus as claimed in claim 1,
the one or more processors being configured to detect connection of a new device that requires an update of the firmware in the information processing apparatus, wherein
the firmware information obtaining condition is detection of connection of the new device.

8. The information processing apparatus as claimed in claim 1,
the one or more processors being configured to detect an error that has occurred in the information processing apparatus, wherein
the firmware information obtaining condition is detection of the error.

9. The information processing apparatus as claimed in claim 1, wherein
the one or more processors again obtains, from the external system, the firmware information in a case where the firmware in the latest version concerning the firmware information has not been downloaded even when a predetermined time has elapsed after the firmware information was obtained.

10. The information processing apparatus as claimed in claim 1,
the one or more processors being configured to determine whether a download condition for downloading the firmware in the latest version has been satisfied, wherein
the one or more processors downloads, from the external system, the firmware in the latest version when the download condition has been satisfied.

11. The information processing apparatus as claimed in claim 10,
the one or more processors being configured to detect that an input signal has not been sent to the information processing apparatus for a predetermined period of time, wherein the download condition is a fact that the input signal has not been sent to the information processing apparatus for the predetermined period of time.

12. The information processing apparatus as claimed in claim 10,
the one or more processors being configured to detect the coming of a previously set date and time for downloading the firmware in the latest version, the previously set date and time being set by a user of the information processing apparatus, wherein
the download condition is the coming of the date and time for downloading the firmware in the latest version.

13. The information processing apparatus as claimed in claim 10, wherein
the download condition is detection of pressing, by a user, a power-off switch in the information processing apparatus, and the one or more processors downloads, from the external system, the firmware in the latest version during a period of time until the power supply in the information processing apparatus is stopped since the detection of pressing, by the user, the power-off switch.

14. The information processing apparatus as claimed in claim 1, wherein
the one or more processors downloads, from the external system, the firmware in the latest version immediately after the one or more processors has determined that it is possible to update the firmware in the information processing apparatus.

15. The information processing apparatus as claimed in claim 1, wherein
the one or more processors compares the obtained sets of version information of the respective modules included in the firmware in the latest version with the sets of version information of the corresponding respective modules included in the configuration information, and downloads, from the external system, only the module of the firmware in the latest version for which the version information in the firmware in the latest version is different from the version information in the configuration information.

16. The information processing apparatus as claimed in claim 1,
the one or more processors being configured to perform user authentication.

17. The information processing apparatus as claimed in claim 16, wherein
the one or more processors performs user authentication immediately before starting downloading of the firmware in the latest version.

18. A network system comprising:
a memory in which firmware that includes a plurality of modules is mounted; and
one or more processors configured to
store configuration information that includes sets of version information of the respective modules included in the firmware in the memory;
obtain, based on the configuration information, firmware information that includes sets of version information of respective modules of firmware in a latest version corresponding to those of the firmware in the memory;
perform a first comparison of the overall sets of version information included in the configuration information with the overall sets of version information included in the firmware information, and, in a case where the sets of version information in the configuration information are not coincident with the sets of version information in the firmware information, determine that it is possible to update the firmware in the memory;

in response to making the determination as a result of the first comparison, download the firmware in the latest version corresponding to the firmware in the memory for which the one or more processors has determined that it is possible to update, the downloaded firmware including a separate latest version of each of the respective modules included in an information processing apparatus; and after downloading the firmware in the latest version, perform a second comparison of the version information of each of the respective modules in the downloaded firmware in the latest version with the version information of each of the respective modules in the configuration information, and update only a module of the firmware in the memory for which the version information in the downloaded firmware is different from the version information in the configuration information, wherein the one or more processors are configured to detect the coming of a previously set date and time for obtaining the firmware information, the previously set date and time being set by a user of the information processing apparatus, the one or more processors are configured to determine whether a firmware information obtaining condition has been satisfied, the firmware information obtaining condition being the coming of the date and time for obtaining the firmware information, and the one or more processors obtains the firmware information from an external system when the firmware information obtaining condition has been satisfied.

19. A method, implemented by an information processing apparatus that includes firmware that has a plurality of modules, the method comprising:

storing configuration information that includes sets of version information of the respective modules included in the firmware;

obtaining, based on the configuration information, from an external system, firmware information that includes sets of version information of respective modules of firmware in a latest version;

performing a first comparison of the overall sets of version information included in the configuration information with the overall sets of version information included in the firmware information, and, in a case where the overall sets of version information in the configuration information are not coincident with the overall sets of version information in the firmware information, determine that it is possible to update the firmware in the information processing apparatus;

in response to making the determination based on the result of the first comparison, downloading, from the external system, the firmware in the latest version corresponding to the firmware in the information processing apparatus for which it has been determined that it is possible to update, the downloaded firmware including a separate latest version of each of the respective modules included on the information processing apparatus; and after downloading the firmware in the latest version, performing a second comparison of version information of each the respective modules included in the downloaded firmware in the latest version with version information of each of the corresponding respective modules included in the configuration information, and updating only a module of the firmware in the information processing apparatus for which the version information in the downloaded firmware is different from the version information in the configuration information, the method further comprising:

detecting the coming of a previously set date and time for obtaining the firmware information, the previously set date and time being set by a user of the information processing apparatus, determining whether a firmware information obtaining condition has been satisfied, the firmware information obtaining condition being the coming of the date and time for obtaining the firmware information, and obtaining the firmware information from the external system when the firmware information obtaining condition has been satisfied.

* * * * *